(12) United States Patent
Yamakawa et al.

(10) Patent No.: US 9,791,659 B2
(45) Date of Patent: Oct. 17, 2017

(54) IMAGING MODULE AND ELECTRONIC DEVICE

(71) Applicant: FUJIFILM Corporation, Tokyo (JP)

(72) Inventors: Kenji Yamakawa, Saitama (JP); Yoshiyuki Takase, Saitama (JP); Masaru Inamura, Saitama (JP); Tatsuya Fujinami, Saitama (JP); Manabu Tobise, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 80 days.

(21) Appl. No.: 15/008,122

(22) Filed: Jan. 27, 2016

(65) Prior Publication Data
US 2016/0139357 A1 May 19, 2016

Related U.S. Application Data

(63) Continuation of application No. PCT/JP2014/068566, filed on Jul. 11, 2014.

(30) Foreign Application Priority Data

Jul. 30, 2013 (JP) .................................. 2013-157720

(51) Int. Cl.
*G02B 7/02* (2006.01)
*G02B 7/04* (2006.01)
(Continued)

(52) U.S. Cl.
CPC ............... *G02B 7/023* (2013.01); *G02B 7/04* (2013.01); *G02B 7/08* (2013.01); *G02B 27/646* (2013.01);
(Continued)

(58) Field of Classification Search
CPC . G02B 7/023; G02B 7/04; G02B 7/08; G02B 27/646; G03B 3/10; G03B 5/00;
(Continued)

(56) References Cited

U.S. PATENT DOCUMENTS 7,881,598 B1 *  2/2011  Wu ........................ G03B 17/00
                                                         396/133
8,947,545 B2 *  2/2015  Han ...................... H04N 5/2254
                                                         348/374
(Continued)

FOREIGN PATENT DOCUMENTS

JP       2005-175971 A      6/2005
JP       2010-21985 A       1/2010
(Continued)

OTHER PUBLICATIONS

English Translation of International Preliminary Report on Patentability (including PCT/IB/373 and PC/ISA/237) for PCT/JP2014/068566, dated Jan. 4, 2016.
(Continued)

*Primary Examiner* — Nhan T Tran
(74) *Attorney, Agent, or Firm* — Birch, Stewart, Kolasch & Birch, LLP

(57) ABSTRACT

The present invention provides an imaging module capable of performing positioning of an imaging element unit, and a lens unit at a low cost and with high precision and an electronic device including the imaging module. An imaging module 100 includes a lens unit 10 including VCMs 16A, 16C, and 16E which move a lens group 12 in an x direction, a y direction, and a z direction, respectively, terminals 14A and 14B which are connected to the VCM 16A, terminals 14C and 14D which are connected to the VCM 16C, and terminals 14E and 14F which are connected to the VCM 16E, and an imaging element unit 20 including terminals 24A to 24F which are connected to the terminals 14A to 14F. Exposed areas of the terminals 14A and 14B are larger than exposed areas of the terminals 14C to 14F.

20 Claims, 11 Drawing Sheets

(51) Int. Cl.
*H04N 5/225* (2006.01)
*G03B 5/00* (2006.01)
*G03B 17/02* (2006.01)
*G02B 7/08* (2006.01)
*G02B 27/64* (2006.01)
*G03B 3/10* (2006.01)

(52) U.S. Cl.
CPC ............... *G03B 3/10* (2013.01); *G03B 5/00* (2013.01); *G03B 17/02* (2013.01); *H04N 5/2252* (2013.01); *H04N 5/2254* (2013.01); *H04N 5/2257* (2013.01); *G03B 2205/0069* (2013.01)

(58) Field of Classification Search
CPC ... H04N 5/2252; H04N 5/2254; H04N 5/2257
USPC .......................................... 348/374, 373, 335
See application file for complete search history.

(56) References Cited

U.S. PATENT DOCUMENTS

| | | | |
|---|---|---|---|
| 2005/0129384 A1 | 6/2005 | Nishida et al. | |
| 2008/0254652 A1* | 10/2008 | Ma .................... | H01R 12/592 439/67 |
| 2009/0180021 A1 | 7/2009 | Kikuchi et al. | |
| 2010/0085474 A1 | 4/2010 | Morita | |
| 2011/0122267 A1* | 5/2011 | Ahn .................... | H04N 5/2253 348/208.7 |
| 2011/0217029 A1* | 9/2011 | Wu ..................... | G03B 17/00 396/55 |
| 2011/0286732 A1 | 11/2011 | Hosokawa et al. | |
| 2012/0236167 A1* | 9/2012 | Takano .............. | H04N 5/2257 348/208.2 |
| 2013/0016427 A1* | 1/2013 | Sugawara ........... | H04N 5/2254 359/557 |
| 2013/0215284 A1* | 8/2013 | Wade .................. | H04N 5/2328 348/208.7 |
| 2014/0092265 A1* | 4/2014 | Hsu .................... | H04N 5/2257 348/208.7 |

FOREIGN PATENT DOCUMENTS

| | | |
|---|---|---|
| JP | 2010-88088 A | 4/2010 |
| JP | 2011-247909 A | 12/2011 |
| JP | 2011-257555 A | 12/2011 |
| WO | WO 2006/075381 A1 | 7/2006 |

OTHER PUBLICATIONS

International Preliminary Report on Patentability (PCT/IPEA/409), issued in PCT/JP2014/068566, dated Aug. 25, 2015.
International Search Report issued in PCT/JP2014/068566, dated Oct. 14, 2014.
Written Opinion of the International Searching Authority issued in PCT/JP2014/068566, dated Oct. 14, 2014.

* cited by examiner

IMAGING MODULE AND ELECTRONIC DEVICE

CROSS-REFERENCE TO RELATED APPLICATIONS

This application is a Continuation of PCT International Application No. PCT/JP2014/068566 filed on Jul. 11, 2014, which claims priority under 35 U.S.C §119(a) to Japanese Patent Application No. 2013-157720 filed on Jul. 30, 2013. Each of the above application(s) is hereby expressly incorporated by reference, in its entirety, into the present application.

BACKGROUND OF THE INVENTION

1. Field of the Invention

The present invention relates to a manufacturing method of an imaging module, an imaging module and an electronic device having the imaging module.

2. Description of the Related Art

A small and thin imaging module is mounted on a portable electronic device such as a portable phone having a photographing function. The imaging module has a structure in which a lens unit, into which a photographic lens is incorporated, and an imaging element unit into which an imaging element such as a CCD image sensor, a CMOS image sensor, or the like is incorporated are integrated with each other.

As the imaging module, there is an imaging module which has an auto focus (AF) mechanism which moves a lens in the lens unit for performing focus adjustment, and an imaging module which has an optical type image blur correction mechanism which relatively moves the lens unit and the imaging element unit in a direction orthogonal to an optical axis for optically correcting blur of a captured image.

For example, JP2010-21985A and JP2010-88088A disclose the imaging module having the AF mechanism, and JP2011-247909A discloses the imaging module having the AF mechanism and the optical type image blur correction mechanism.

In recent years, instead of an imaging element having a low pixel number such as approximately one million pixels to two million pixels, an imaging element having a high pixel number such as three million pixels to ten million pixels or more is widely used in the imaging module.

When the imaging element of a low pixel number is used, particularly, high accuracy is not required for positioning of the lens unit and the imaging element unit. However, when the imaging element having a high pixel number is used, high accuracy is required for the positioning.

In JP2010-21985A and JP2010-88088A, a technology is disclosed in which positioning of a lens unit and an imaging element unit and fixation between the lens unit and the imaging element unit are automatically performed.

In this technology, after the lens unit and the imaging element unit are set to an initial position, a measurement chart is captured by the imaging element while the imaging element unit moves in an optical axis direction, and the positions of the lens unit and the imaging element unit are adjusted from the obtained captured image. After the adjustment, the lens unit and the imaging element unit are bonded and fixed to each other.

SUMMARY OF THE INVENTION

In the imaging module having the AF mechanism and the optical type image blur correction mechanism, for example, the imaging element unit and the lens unit can relatively move in three directions orthogonal to one another. Accordingly, in a process of adjusting the position of the lens unit and the imaging element unit, the lens in the lens unit is affected by gravity and moves in the gravity direction.

By performing positioning of the lens unit and the imaging element unit in a state where the position of the lens moved by gravity is held at a predetermined position, it is possible to accurately perform the positioning.

However, in order to adjust the position of the lens, for example, it is necessary to input drive signals by allowing a probe pin to come into contact with a terminal which is provided in the lens unit to drive the lens.

According to a decrease in a size of the lens unit, since a size of the terminal also decreases, it is necessary to perform positioning of the terminal and the probe pin with high accuracy. Accordingly, high cost in a manufacturing apparatus of the imaging module, or complication in a manufacturing method of the imaging module occurs, and a manufacturing cost of the imaging module increases.

The present invention is made in consideration of the above-described circumstances, and an object thereof is to provide a manufacturing method of an imaging module, an imaging module capable of performing positioning of the imaging element unit and the lens unit at a low cost and with high accuracy, and an electronic device having the imaging module.

An imaging module made by a manufacturing method of the present invention includes a lens unit which includes a lens group, and an imaging element unit which is fixed to the lens unit and includes an imaging element which captures a subject through the lens group. The lens unit includes a first lens driving unit which moves at least a portion of lenses of the lens group in a first direction along an optical axis of the lens group, and a second lens driving unit and a third lens driving unit which move at least a portion of the lenses of the lens group in a second direction and a third direction orthogonal to the optical axis of the lens group, respectively. In addition, the lens unit includes a connection portion group which includes a plurality of first connection portions which electrically connect the first lens driving unit and the imaging element unit, a plurality of second connection portions which electrically connect the second lens driving unit and the imaging element unit, and a plurality of third connection portions which electrically connect the third lens driving unit and the imaging element unit. Moreover, the lens unit includes a housing in which at least a portion of the first lens driving unit, the second lens driving unit, the third lens driving unit, and the connection portion group is accommodated. The imaging element unit includes a fourth connection portion which electrically connects the imaging element unit and each connection portion included in the connection portion group of the lens unit. Each connection portion included in the connection portion group includes an exposed surface, which is exposed outside the housing, in a portion of the connection portion. The connection portion group includes a connection portion in which the exposed surface has a first area, and a connection portion in which the exposed surface has a second area which is larger than the first area. Among the plurality of first connection portions, the plurality of second connection portions, and the plurality of third connection portions, any one of the exposed surfaces of at least the plurality of second connection portions and the plurality of third connection portions has the second area. The manufacturing method includes an adjustment process of allowing electricity to flow to the connection portion having the second area in a probing manner so as to drive the lens driving unit, and adjusting positions of the lens unit and the imaging element unit, and a process of fixing the lens unit and the imaging element unit after the adjustment process.

An electronic device of the present invention includes the imaging module.

According to the present invention, it is possible to provide a manufacturing method of an imaging module, an image module capable of performing positioning of the imaging element unit and the lens unit at a low cost and with high accuracy, and the electronic device having the imaging module.

DESCRIPTION OF THE PREFERRED EMBODIMENTS

Hereinafter, embodiments of the present invention will be described with reference to the drawings.

Figure 1:
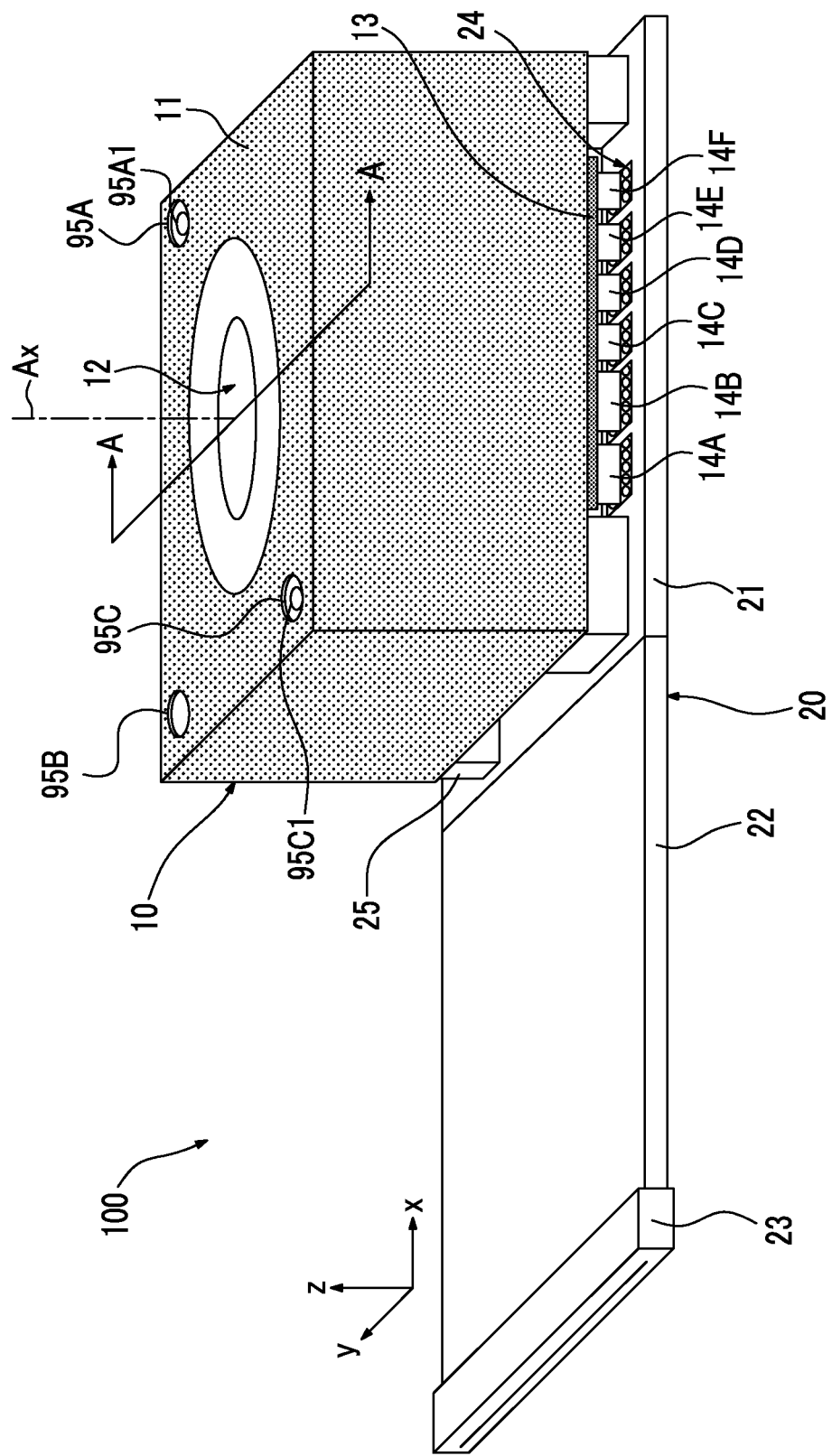
FIG. 1 is an external perspective view of an imaging module 100 according to an embodiment of the present invention.

FIG. 1 is an external perspective view of an imaging module 100 according to an embodiment of the present invention.

The imaging module 100 includes a lens unit 10 which includes a lens group 12, and an imaging element unit 20 which is fixed to the lens unit 10 and includes an imaging element (not shown in FIG. 1) which captures a subject through the lens group 12.

In FIG. 1, a direction along an optical axis Ax of the lens group 12 is defined as a z direction, and two directions which are orthogonal to the z direction and are orthogonal to each other are defined as an x direction and a y direction, respectively.

The lens unit 10 includes a housing 11 in which components described below are accommodated. A portion of a flexible substrate 13 accommodated in the housing 11 is exposed outside the housing 11.

A lens unit terminal portion (connection portion group) including terminals 14A to 14F which are connection portions for achieving an electric connection are connected to the distal end of the exposed portion of the flexible substrate 13. The terminals included in the lens unit terminal portion are arranged in the x direction.

In addition, as described below, the lens unit terminal portion includes other terminals in addition to the terminals 14A to 14F. However, in FIG. 1, for simplification, only the terminals 14A to 14F are shown, and other terminals are not shown.

In addition, the entire flexible substrate 13 is accommodated in the housing 11, each terminal of the lens unit terminal portion is connected to the distal end of the flexible substrate 13, and only a portion of each terminal may be exposed outside the housing 11.

An opening is provided on a top plate of the housing 11 and the lens group 12 is exposed from this opening. The imaging module 100 receives light from a subject through the opening and performs imaging.

Moreover, positioning concave sections 95A, 95B, and 95C for holding the lens unit 10 to a manufacturing apparatus when the imaging module 100 is manufactured are formed on the top plate of the housing 11. Concave sections 95A1 and 95C1 which are smaller than the concave sections 95A and 95C are formed on bottom surfaces of the concave sections 95A and 95C which are disposed on a diagonal line on the top plate.

Figure 2:
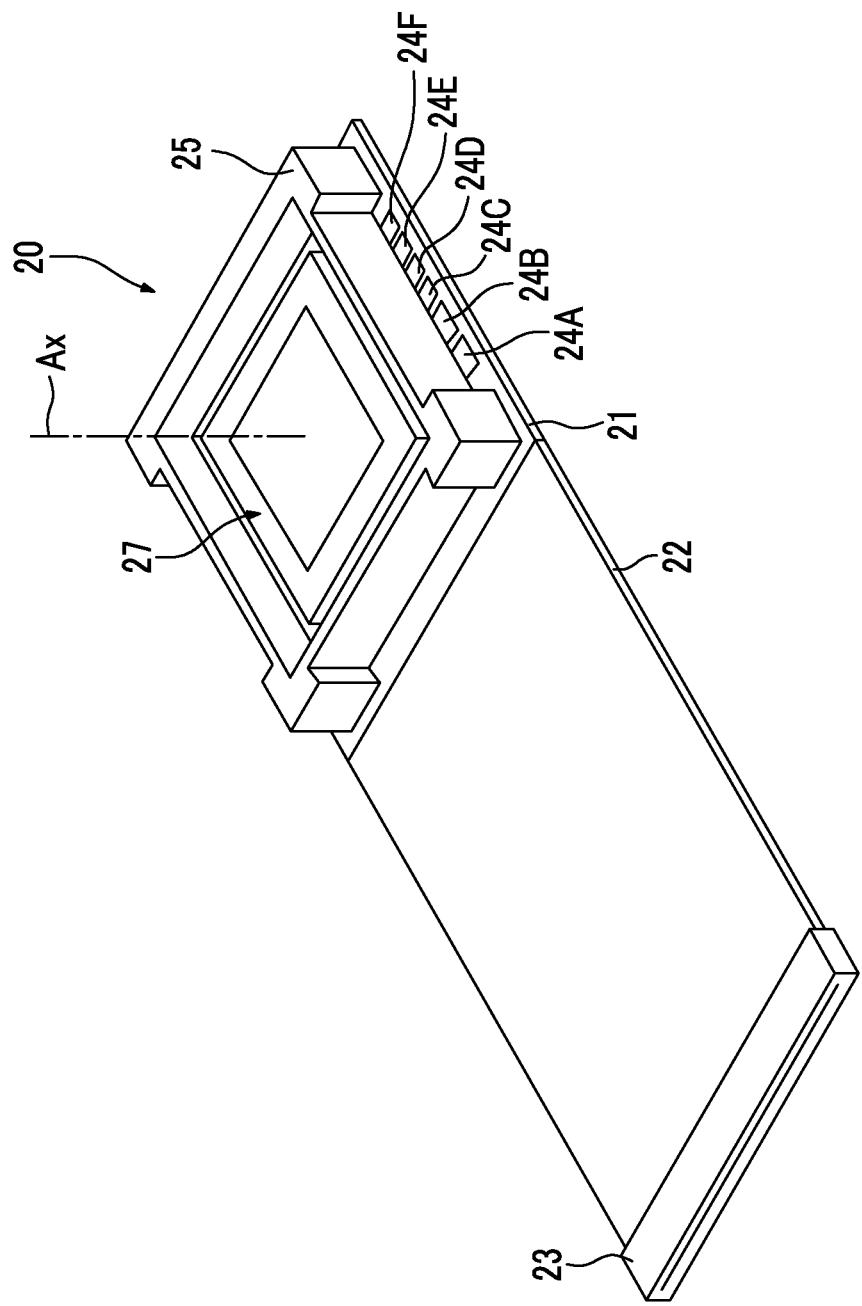
FIG. 2 is an external perspective view of an imaging element unit 20 in a state where a lens unit 10 is omitted in the imaging module 100 shown in FIG. 1.

FIG. 2 is an external perspective view showing a state where the lens unit 10 is omitted in the imaging module 100 shown in FIG. 1.

As shown in FIG. 2, the imaging element unit 20 includes a substrate 21 on which an imaging element 27 such as a Charge Coupled Device (CCD) image sensor or a Complementary Metal-Oxide Semiconductor (CMOS) image sensor is formed, and a flexible substrate 22 which is electrically connected to the substrate 21.

An outer edge shape of the imaging element 27 is a rectangular shape (is not limited to a complete rectangular shape, and is a substantially a rectangular shape). In a plan view in which the imaging module 100 is viewed from the subject side, among four main sides which configure outer edges of the imaging element 27, two parallel sides are parallel to the x direction, and the remaining two sides are parallel to the y direction.

A pixel pitch of the imaging element 27 is not particularly limited. However, an imaging element having a pixel pitch of 1.0 μm or less may be used as the imaging element 27. Here, the pixel pitch means the minimum distance among distances between centers of photoelectrically converted regions included in pixels provided in the imaging element 27.

In recent years, the pixel pitch of the imaging element decreases according to an increase of a pixel number. If the pixel pitch decreases, an area per one pixel decreases. Accordingly, a radius of an allowable circle of confusion decreases, and a focal depth decreases. In addition, since it is necessary to increase a condensed light amount per one pixel, an F-number of the lens is likely to be decreased.

Accordingly, in recent years, since the focal depth of the imaging module is very narrow, it is necessary to perform positioning of the lens unit and the imaging element unit with high accuracy. Particularly, if the pixel pitch is 1.0 μm or less, high positioning accuracy is required.

A tubular cover holder 25 is formed on the substrate 21, and an imaging element 27 is disposed inside the cover holder 25. A cover glass (not shown) is fitted to the upper portion of the imaging element 27 in a hollow portion of the cover holder 25.

An imaging element unit terminal portion including terminals 24A and 24F which are connection portions (fourth connection portions) for electrically connecting to the lens unit 10 are formed on the surface of the substrate 21 on the outside of the cover holder 25. Similarly to the lens unit terminal portion, in the imaging element unit terminal portion, only some terminals are shown. The terminals of the imaging element unit terminal portion are arranged in the x direction in a plan view.

An imaging element wire, which is connected to a data output terminal, a drive terminal, or the like of the imaging element 27, is provided on the substrate 21. The imaging element wire is connected to an external connection terminal portion 23, which is provided on the end portion of the flexible substrate 22, via a wire provided on the flexible substrate 22.

In addition, a lens unit wire, which is connected to each terminal included in the imaging element unit terminal portion, is provided on the substrate 21. The lens unit wire is connected to the external connection terminal portion 23, which is provided on the end portion of the flexible substrate 22, via the wire provided on the flexible substrate 22.

As shown in FIG. 1, in a state where the lens unit 10 and the imaging element unit 20 are fixed, each terminal of the lens unit terminal portion and each terminal of the imaging element unit terminal portion corresponding to each terminal of the lens unit terminal portion are electrically connected to each other. That is, it is possible to drive imaging element unit 20 and the lens unit 10 using the external connection terminal portion 23.

In the state where the lens unit 10 and the imaging element unit 20 are fixed, in the example of FIG. 1, the terminal 14A and the terminal 24A are electrically connected to each other, the terminal 14B and the terminal 24B are electrically connected to each other, the terminal 14C and the terminal 24C are electrically connected to each other, the terminal 14D and the terminal 24D are electrically connected to each other, the terminal 14E and the terminal 24E are electrically connected to each other, and the terminal 14F and the terminal 24F are electrically connected to each other.

Figure 3:
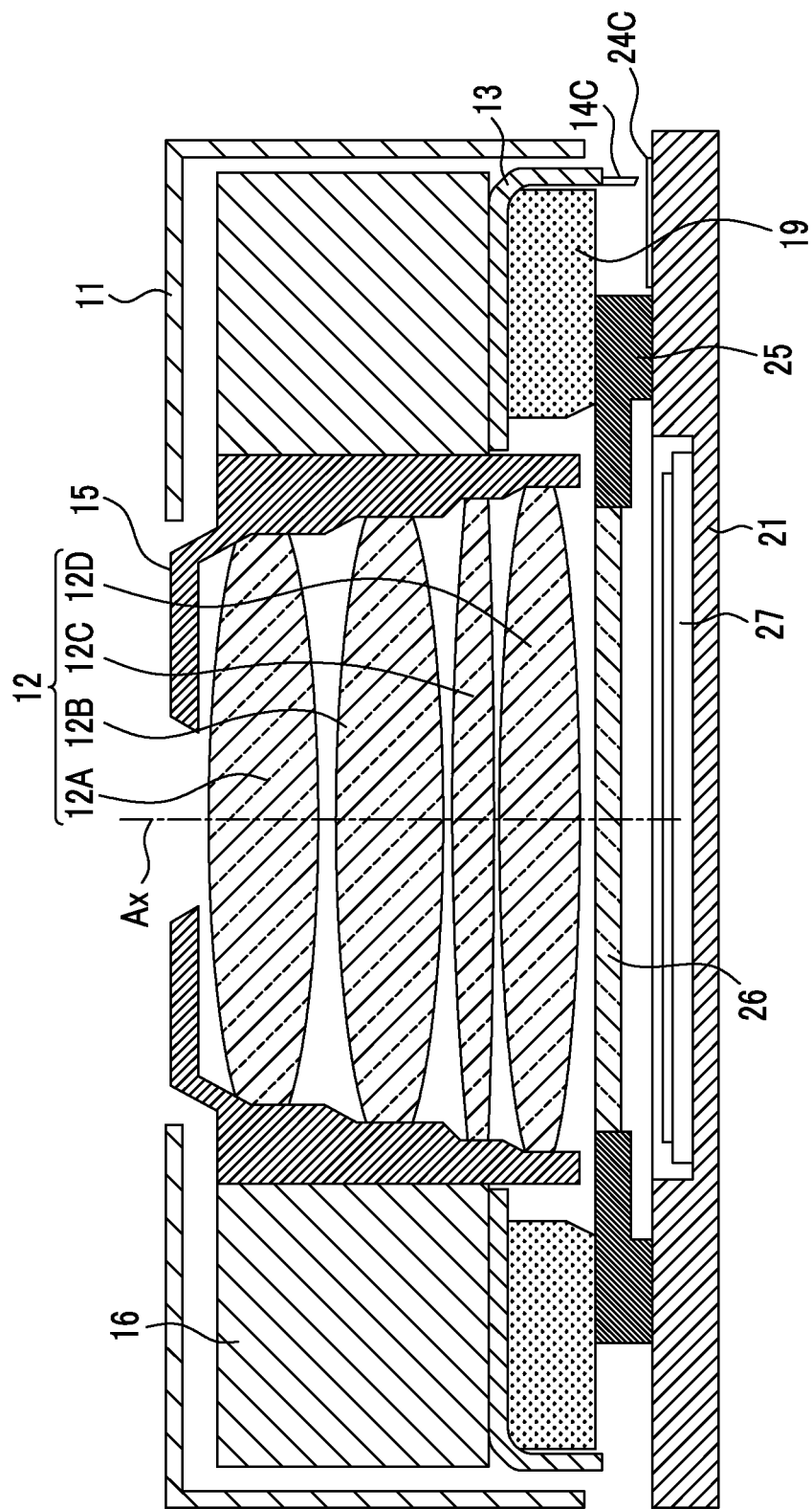
FIG. 3 is a sectional view taken along line A-A of the imaging module 100 shown in FIG. 1.

FIG. 3 is a sectional view taken along line A-A of the imaging module 100 shown in FIG. 1.

As shown in FIG. 3, the imaging element 27 is disposed in a concave section provided on the substrate 21, and is sealed by the cover holder 25 provided on the substrate 21 and a cover glass 26 fitted to the cover holder 25.

In addition, as shown in FIG. 3, the lens unit 10 includes the lens group 12 which includes a plurality of lenses (four lenses 12A to 12D in the example of FIG. 3) disposed above the cover glass 26, a tubular lens barrel 15 which supports the lens group 12, a bottom block 19 which is disposed on the upper surface of the cover holder 25 of the imaging element unit 20, the flexible substrate 13 which is fixed to the bottom block 19, the lens unit terminal portions (only the terminal 14C is shown since FIG. 3 is a sectional view) which are connected to the flexible substrate 13, and a lens drive unit 16 which is formed on the flexible substrate 13.

The lens group 12, the lens barrel 15, the bottom block 19, the flexible substrate 13, and the lens drive unit 16 are accommodated in the housing 11.

The lens drive unit 16 includes a first lens driving unit, a second lens driving unit, a third lens driving unit, and a hall element which is a position detection element for detecting the position of the lens.

The first lens driving unit is a driving unit which moves at least a portion (all lenses of the lens group 12 in the example of FIG. 3) of the lenses of the lens group 12 in a first direction (z direction in FIG. 1) along the optical axis Ax of the lens group 12 so as to perform focus adjustment.

The second lens driving unit and the third lens driving unit are driving units which respectively move at least a portion (all lenses of the lens group 12 in the example of FIG. 3) of the lenses of the lens group 12 in a second direction (x direction in FIG. 1) and a third direction (y direction in FIG. 1) orthogonal to the optical axis Ax of the lens group 12 so as to correct blur of an image captured by the imaging element 27.

Each of the first lens driving unit, the second lens driving unit, and the third lens driving unit is an actuator for moving the lens, and in the present embodiment, is configured of a voice coil motor (VCM). However, each lens driving unit may adopt other known means.

Figure 4:
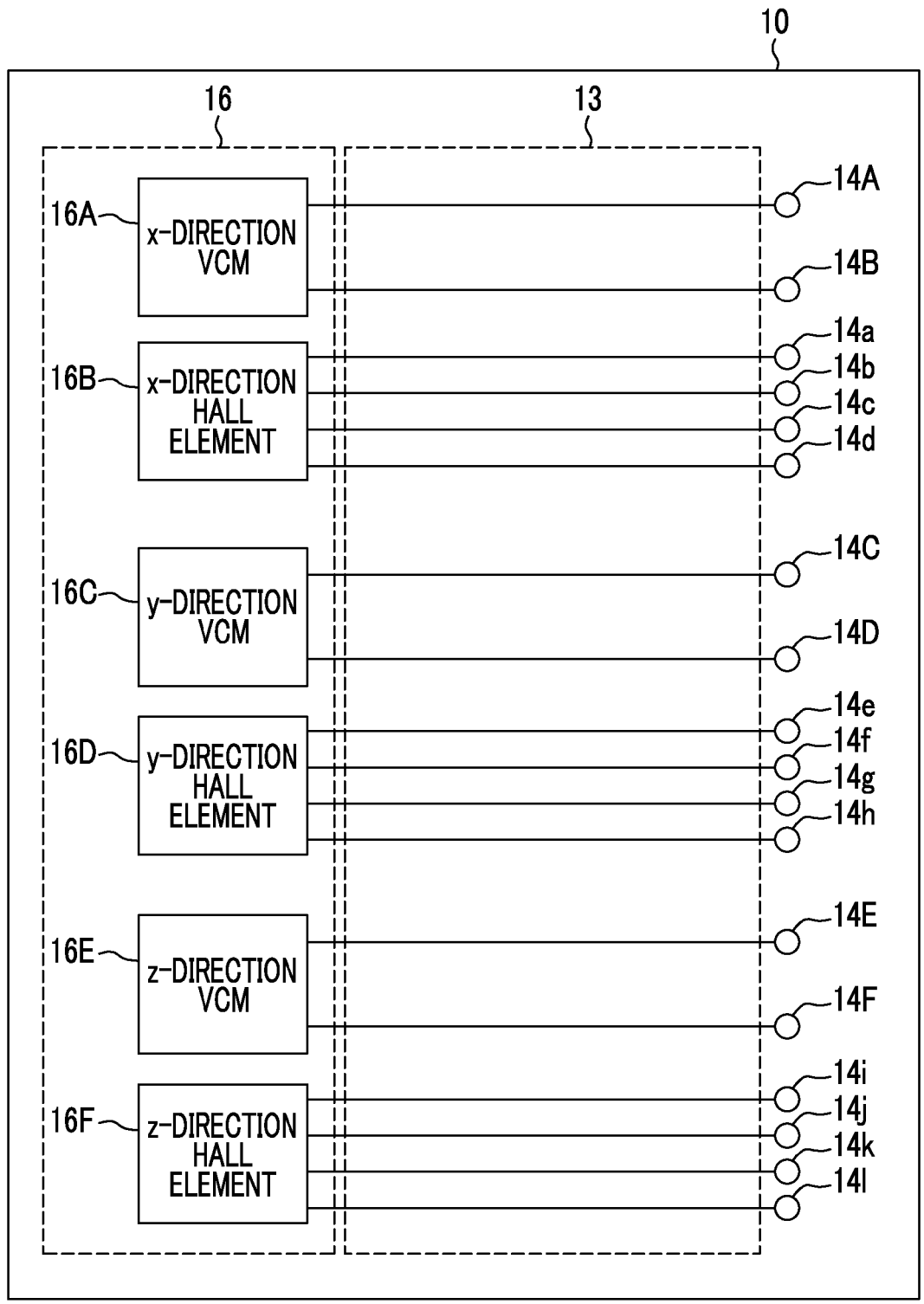
FIG. 4 is a view showing an electric connection configuration inside the lens unit 10 shown in FIG. 2.

FIG. 4 is a block diagram showing an electric connection configuration of the lens unit 10 shown in FIG. 1.

As shown in FIG. 4, the lens drive unit 16 includes an x-direction VCM 16A (the second lens driving unit) for moving the lens group 12 in the x direction, and an x-direction hall element 16B for detecting a position of the lens group 12 in an x direction. In addition, the lens drive unit 16 includes a y-direction VCM 16C (the third lens driving unit) for moving the lens group 12 in the y direction, and a y-direction hall element 16D for detecting a position of the lens group 12 in a y direction. Moreover, the lens drive unit 16 includes a z-direction VCM 16E (the first lens driving unit) for moving the lens group 12 in the z direction, and a z-direction hall element 16F for detecting a position of the lens group 12 in a z direction.

Two terminals are formed on the x-direction VCM 16A, and the two terminals are electrically connected to the terminal 14A and the terminal 14B via wires formed on the flexible substrate 13, respectively. That is, the terminal 14A and the terminal 14B function as a plurality of second connection portions.

Four terminals are formed on the x-direction hall element 16B, and the four terminals are electrically connected to the terminal 14a, the terminal 14b, the terminal 14c, and the terminal 14d via wires formed on the flexible substrate 13, respectively.

Two terminals are formed on the y-direction VCM 16C, and the two terminals are electrically connected to the terminal 14C and the terminal 14D via wires formed on the flexible substrate 13, respectively. That is, the terminal 14C and the terminal 14D function as a plurality of third connection portions.

Four terminals are formed on the y-direction hall element 16D, and the four terminals are electrically connected to a terminal 14e, a terminal 14f, a terminal 14g, and a terminal 14h via wires formed on the flexible substrate 13, respectively.

Two terminals are formed on the z-direction VCM 16E, and the two terminals are electrically connected to the terminal 14E and the terminal 14F via wires formed on the flexible substrate 13, respectively. That is, the terminal 14E and the terminal 14F function as a plurality of first connection portions.

Four terminals are formed on the z-direction hall element 16F, and the four terminals are electrically connected to a terminal 14*i*, a terminal 14*j*, a terminal 14*k*, and a terminal 14*l* via wires formed on the flexible substrate 13, respectively.

The terminals 14A to 14F and the terminals 14*a* to 14*l* configure the lens unit terminal portion. The lens unit terminal portion may include a ground terminal in addition to the terminals.

The number of required terminals with respect to each lens driving unit and each hall element is an example, and is not limited to the above-described number.

In a manufacturing process of the imaging module 100 configured as described above, first, the lens unit 10 and the imaging element unit 20 are separately manufactured. In addition, an adjustment process for positioning the lens unit 10 and the imaging element unit 20 is performed so that an image forming surface of the subject formed by the lens group 12 and an imaging surface of the imaging element 27 are coincident with each other, and thereafter, the lens unit 10 and the imaging element unit 20 are bonded and fixed to each other.

In the adjustment process, by moving the imaging element unit 20 in a state where a predetermined state of the lens unit 10 is held by a manufacturing apparatus, the positioning of the lens unit 10 and the imaging element unit 20 is performed. In this case, in the lens unit 10, a state where the x direction shown in FIG. 1 is parallel to the gravity direction is held.

Here, the state of the lens unit 10 in which the x direction is parallel to the gravity direction may be a state of an extent in which the lens group 12 does not move in the y direction and the z direction due to influences of gravity, and the x direction and the gravity direction do not necessarily need to be strictly perpendicular to each other. For example, if the lens group 12 is positioned within a range in which the lens group 12 is not moved in the y direction and the z direction, inclination of the lens unit 10 due to mechanical loss, friction resistance, or the like is allowed.

In the imaging module 100, the lens group 12 can move in the x direction by the second lens driving unit (x-direction VCM 16A). Accordingly, when the state of the lens unit 10 where the x direction shown in FIG. 1 is parallel to the gravity direction is held, since the position of the lens group 12 is affected by gravity, it is assumed that the position of the lens group 12 is deviated in the x direction from a reference position for the positioning.

Accordingly, in the adjustment process, communication probe pins come into contact with exposed surfaces of the terminals 14A and 14B which are exposed outside the housing 11, electricity flows to the terminals 14A and 14B, the second lens driving unit is driven, and the position in the x direction of the lens group 12 is held at the reference position.

In addition, in this state, the positioning of the lens unit 10 and the imaging element unit 20 is performed. Accordingly, in all imaging modules 100 which are manufactured, the positioning can be performed under the same conditions, and it is possible to perform the adjustment with high accuracy.

In addition, in most cases, an electronic device (for example, a digital camera, a portable phone, or the like) on which the imaging module 100 is mounted is used in the state where the x direction shown in FIG. 1 is parallel to the gravity direction. In this state, the electronic device performs imaging control by returning an initial position of the lens group 12 to a side opposite to the gravity direction by the lens group 12 being lowered in the x direction by gravity.

Accordingly, during the adjustment process, by setting the reference position to the position (the initial position) at which the lens group 12 is returned to the side opposite to the gravity direction by the lens group 12 being lowered in the x direction by gravity, the positioning can be performed in a state close to an actual use state, and it is possible to perform the adjustment with high accuracy.

In the imaging module 100, in order to easily perform the contact of the probe pins with respect to the exposed surfaces of the terminals 14A and 14B, among all terminals included in the lens unit terminal portion, exposed areas of the terminals 14A and 14B are larger than exposed areas of terminals (terminals 14C to 14F and terminals 14*a* to 14*l*) except for the terminals 14A and 14B.

As shown in FIG. 1, an arrangement direction of the terminals 14A to 14F is the x direction, and lengths in the z direction on the exposed surfaces of the terminals 14A to 14F are the same as each other. In addition, by allowing lengths in the x direction on the exposed surfaces of the terminals 14A and 14B to be larger than lengths in the x direction on the exposed surfaces of the terminals 14C to 14F, the exposed areas of the terminals 14A and 14B are larger than the exposed areas of the terminals 14C to 14F.

If the exposed areas of the terminals 14A and 14B are small, it is necessary to perform the positioning of the probe pin with respect to the exposed areas of the terminals 14A and 14B with high accuracy, and a cost of the manufacturing apparatus increases.

According to the imaging module 100, since the exposed areas of the terminals 14A and 14B are large, it is not necessary to perform the positioning of the probe pin with respect to the exposed areas of the terminals 14A and 14B with high accuracy, and it is possible to prevent the cost of the manufacturing apparatus from increasing. As a result, it is possible to reduce the manufacturing cost of the imaging module 100.

In addition, effective probing is performed as the exposed areas of the terminals 14A and 14B, through which electricity flows in the adjustment process, increases. In order to obtain the effects, preferably, a ratio of the area of the terminal through which electricity flows in the adjustment process with respect to the area of the terminal through which electricity does not need to flow in the adjustment process is 1.4 times or more. Meanwhile, preferably, an upper limit of the area ratio is set so as to be suppressed to reach an extent in which adverse effects such as a case where the exposed areas of other terminals excessively decrease, a case where a size of the imaging module increases, or the like, do not occur.

Figure 5:
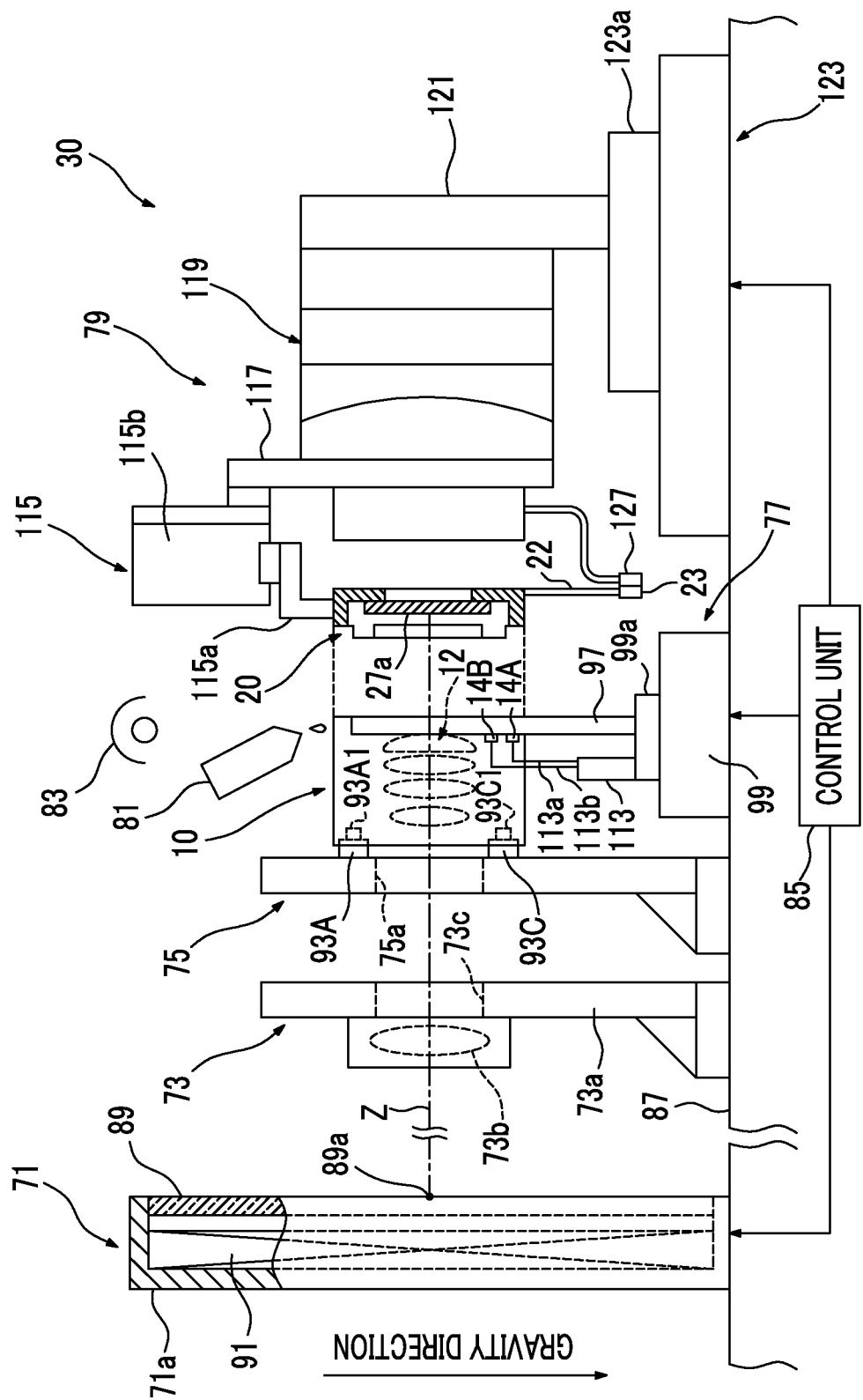
FIG. 5 is a side view showing a schematic configuration of a manufacturing apparatus 30 of the imaging module 100.

FIG. 5 is a side view showing a schematic configuration of a manufacturing apparatus 30 of the imaging module 100.

The imaging module manufacturing apparatus 30 adjusts the position of the imaging element unit 20 with respect to the lens unit 10, and the imaging module 100 is completed by fixing the imaging element unit 20 to the lens unit 10 after the adjustment.

The imaging module manufacturing apparatus 30 includes a chart unit 71, a collimator unit 73, a lens positioning plate 75, a lens holding mechanism 77, an element movement mechanism 79, an adhesive supply portion 81, an ultraviolet lamp 83, and a control unit 85 which controls the above-described components. The components are installed on a common workbench 87.

The chart unit 71 is configured of a box-shaped housing 71*a*, a measurement chart 89 which is fitted into the housing 71*a*, and a light source 91 which is incorporated into the housing 71*a* and illuminates the measurement chart 89 from the rear surface of the measurement chart 89 with parallel light. For example, the measurement chart 89 is formed of a plastic plate having light diffusibility.

The collimator unit 73 is disposed to face the chart unit 71 on a Z axis which is a perpendicular line with respect to a chart surface of the measurement chart 89 and is a line passing through a chart surface center 89a.

The collimator unit 73 is configured of a bracket 73a which is fixed to the workbench 87 and a collimator lens 73b. The collimator lens 73b has a function which collects light radiated from the chart unit 71 and positions a virtual image position of the chart with respect to the lens unit 10 at an arbitrary distance (for example, an infinity position or a standard subject position suitable for assumed photographing of the lens unit 10).

For example, the lens positioning plate 75 is formed of a metal so as to have stiffness, and includes an opening portion 75a through which a light beam transmitting the collimator unit 73 passes.

Figure 6:
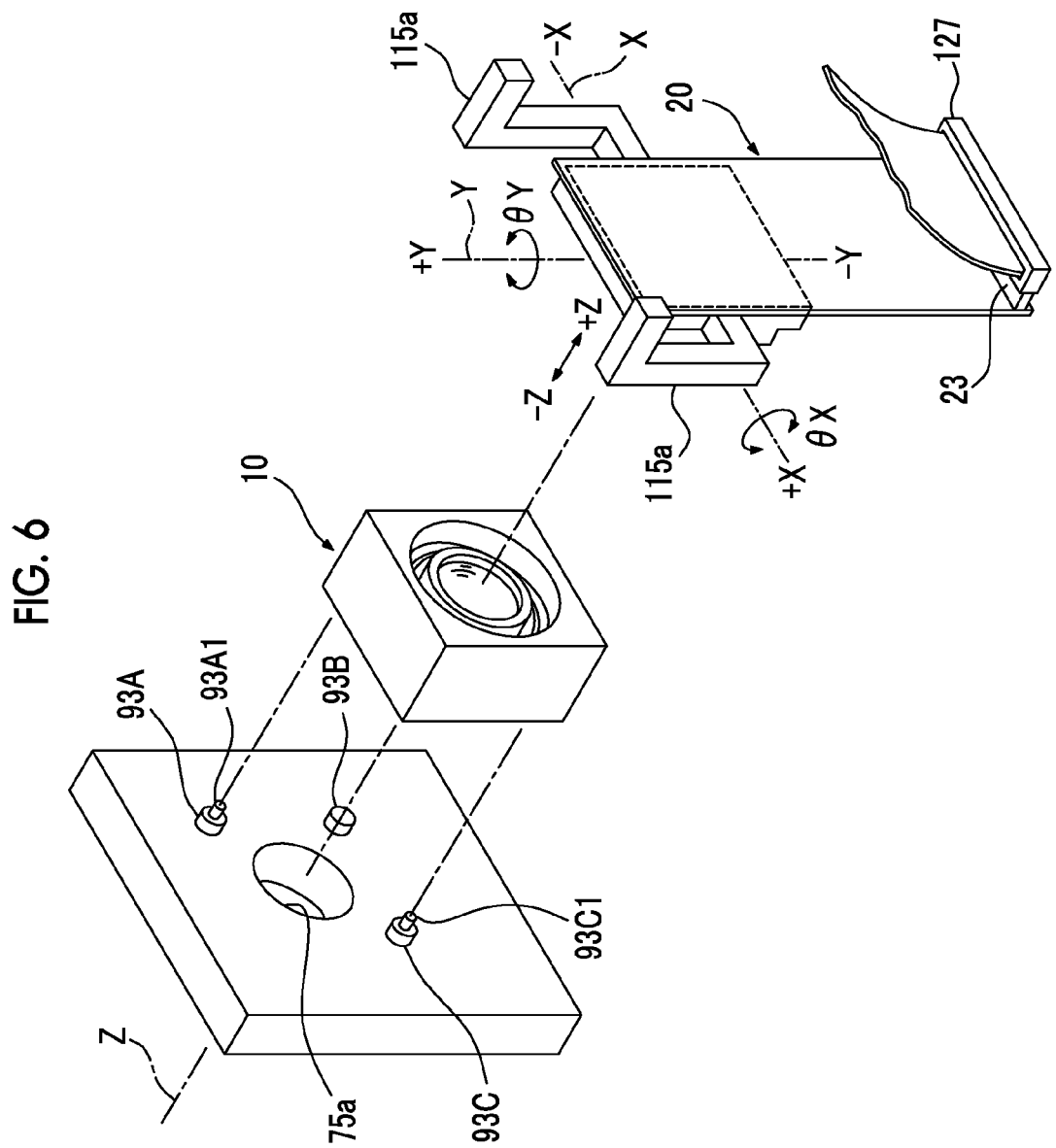
FIG. 6 is an explanatory view showing a state where the lens unit 10 and the imaging element unit 20 are held by the imaging module manufacturing apparatus 30.

FIG. 6 is an explanatory view showing a state where the lens unit 10 and the imaging element unit 20 are held by the imaging module manufacturing apparatus 30.

As shown in FIG. 6, three abutment pins 93A, 93B, and 93C are provided around the opening portion 75a on the surface of the lens holding mechanism 77 side of the lens positioning plate 75.

Among the three abutment pins 93A, 93B, and 93C, insertion pins 93A1 and 93C1 having smaller diameters than those of the abutment pins are provided on the distal ends of two abutment pins 93A and 93C which are positioned on a diagonal line.

The abutment pins 93A, 93B, and 93C are received by the concave sections 95A, 95B, and 95C of the lens unit 10 shown in FIG. 1, the insertion pins 93A1 and 93C1 are inserted into the concave sections 95A1 and 95C1, and the positioning of the lens unit 10 is performed.

In this way, in the state where the lens unit 10 is positioned, the Z axis is coincident with the optical axis Ax of the lens unit 10. In addition, in the lens unit 10, the x direction of FIG. 1 is parallel to the gravity direction.

The lens holding mechanism 77 is configured of a holding plate 97 which holds the lens unit 10 so that the top plate of the housing 11 faces the chart unit 71 on the Z axis, and a first slide stage 99 which moves the holding plate 97 in the Z axis direction.

The first slide stage 99 is an electric precision stage. In the first slide stage, a ball screw is rotated by rotation of a motor (not shown), and a stage portion 99a which engages with the ball screw moves in the Z axis direction.

The holding plate 97 moves in the Z axis direction, the holding plate 97 is pressed to the bottom block 19 of the lens unit 10 positioned by the lens positioning plate 75, and the lens unit 10 is held by the manufacturing apparatus 30.

A probe unit 113 including two probe pins 113a and 113b is attached to the stage portion 99a so as to face the holding plate 97.

The probe pin 113a comes into contact with the terminal 14A of the lens unit 10 and the probe pin 113b comes into contact with the terminal 14B of the lens unit 10. Accordingly, the probe unit 113 is electrically connected to the above-described second lens driving unit.

The probe unit 113 adjusts the position of the lens group 12 of the lens unit 10 so that the position in the x direction of the lens unit 10 on the optical axis Ax is brought into the initial position during the actual use of the imaging module 100.

The element movement mechanism 79 is configured of a chuck hand 115, a biaxial rotation stage 119, and a second slide stage 123. The chuck hand 115 holds the imaging element unit 20 so that the imaging surface 27a faces the chart unit 71 on the Z axis. The biaxial rotation stage 119 holds an approximately crank-shaped bracket 117 to which the chuck hand 115 is attached, and adjusts inclination of the imaging element unit 20 around two axes (horizontal X axis and vertical Y axis) orthogonal to the Z axis. The second slide stage 123 holds a bracket 121 to which the biaxial rotation stage 119 is attached, and moves the bracket 121 in the Z axis direction.

As shown in FIG. 6, the chuck hand 115 is configured of a pair of clamping members 115a which is bent in an approximately crank shape, and an actuator 115b (refer to FIG. 5) which moves the clamping members 115a in the X axis direction orthogonal to the Z axis. The clamping members 115a are inserted into an outer frame of the imaging element unit 20, and the imaging element unit 20 is held.

In addition, the chuck hand 115 positions the imaging element unit 20 which is interposed by the clamping members 115a so that the optical axis Ax of the lens unit 10 and a center position of the imaging surface 27a are substantially coincident with each other. In addition, when viewed from the Z axis direction, the chuck hand 115 positions the imaging element unit 20 which is interposed by the clamping members 115a so that each terminal of the imaging element unit terminal portion of the imaging element unit 20 overlaps each terminal of the lens unit terminal portion of the lens unit 10.

The biaxial rotation stage 119 is an electric twin-axis gonio stage, and inclines the imaging element unit 20 in a θx direction around the X axis and a θy direction around the Y axis orthogonal to the Z axis and the X axis by the rotations of two motors (not shown) with the center position of the imaging surface 27a as the rotation center. Accordingly, when the imaging element unit 20 is inclined in each direction, a positional relationship between the center position of the imaging surface 27a and the Z axis is not misaligned.

The second slide stage 123 is an electric precision stage. In the second slide stage, a ball screw is rotated by rotation of a motor (not shown), and a stage portion 123a which engages with the ball screw moves in the Z axis direction. The bracket 121 is fixed to the stage portion 123a.

A connector cable 127, which is connected to the external connection terminal portion 23 provided on the distal end of the flexible substrate 22 of the imaging element unit 20, is attached to the biaxial rotation stage 119. Drive signals are input to the imaging element 27 through the connection cable 127, or captured image signals output from the imaging element 27 are output through the connection cable 127.

After the positional adjustment of the lens unit 10 and the imaging element unit 20 ends, the adhesive supply portion 81 supplies an ultraviolet curing type adhesive to a gap between the lens unit 10 and the imaging element unit 20.

The ultraviolet lamp 83 irradiates the ultraviolet curing type adhesive supplied to the gap with ultraviolet rays, and the adhesive is cured. Moreover, as the adhesive, in addition to the ultraviolet curing type adhesive, an instantaneous adhesive, a thermosetting type adhesive, a natural curing type adhesive, or the like may be used.

In the imaging module manufacturing apparatus 30, the lens unit 10 is held by a holding plate 97 in the state where the x direction shown in FIG. 1 is parallel to the gravity direction. In the state where the lens unit 10 is held by the holding plate 97, the probe pins 113a and 113b of the probe unit 113 come into contact with the terminals 14A and 14B of the lens unit 10.

Accordingly, the second lens driving unit in the lens unit 10 can be driven, and the control unit 85 controls the position of the lens group 12 in the gravity direction such that the position reaches a predetermined reference position, via the probe unit 113.

In addition, after the imaging element unit 20 interposed between the clamping members 115a is positioned so that the optical axis Ax of the lens unit 10 and the center position of the imaging surface 27a are coincident with each other, the position in the Z axis direction of the imaging element unit 20 is changed, and the position in the Z axis direction of the imaging element unit 20, and angles in the θx direction and the θy direction of the imaging element unit 20 are respectively adjusted based on captured image signals obtained by capturing the measurement chart 89 at each position using the imaging element 27. In addition, the adjustment with respect to the angles in the θx direction and the θy direction of the imaging element unit 20 may be omitted.

After this adjustment is performed, an ultraviolet curing type adhesive is supplied from the adhesive supply portion 81 to the gap between the lens unit 10 and the imaging element unit 20, and the ultraviolet curing type adhesive is cured by turning on the ultraviolet lamp 83.

The adhesive is cured, the completed imaging module 100 is discharged from the imaging module manufacturing apparatus 30.

In addition, the lens unit 10 and the imaging element unit 20 are fixed by the ultraviolet curing type adhesive. However, the curing of the ultraviolet curing type adhesive is used for temporary fixation between the lens unit 10 and the imaging element unit 20.

For example, in a state where the lens unit 10 and the imaging element unit 20 are temporarily fixed to each other, the lens unit 10 and the imaging element unit 20 are discharged from the imaging module manufacturing apparatus 30, a desired process such as cleaning processing is performed, and thereafter, the lens unit 10 and the imaging element unit 20 are completely fixed to each other by a thermosetting type adhesive or the like, and the imaging module 100 may be manufactured.

Since the imaging module 100 is manufactured by the above-described manufacturing apparatus 30, it is possible to perform the positioning of the lens unit 10 and the imaging element unit 20 with high accuracy.

As the imaging element 27, when an imaging element having a small pixel size in which a pixel pitch is 1.0 μm or less is used, as described above, particularly, the positioning accuracy of the lens unit and the imaging element unit is required. Even in this case, according to a combination of the configuration of the lens unit 10 and the manufacturing process using the manufacturing apparatus 30, it is possible to perform the positioning of the lens unit 10 and the imaging element unit 20 at a low cost and with high accuracy.

Next, modification examples of the imaging module 100 will be described.

First Modification Example

Figure 7:
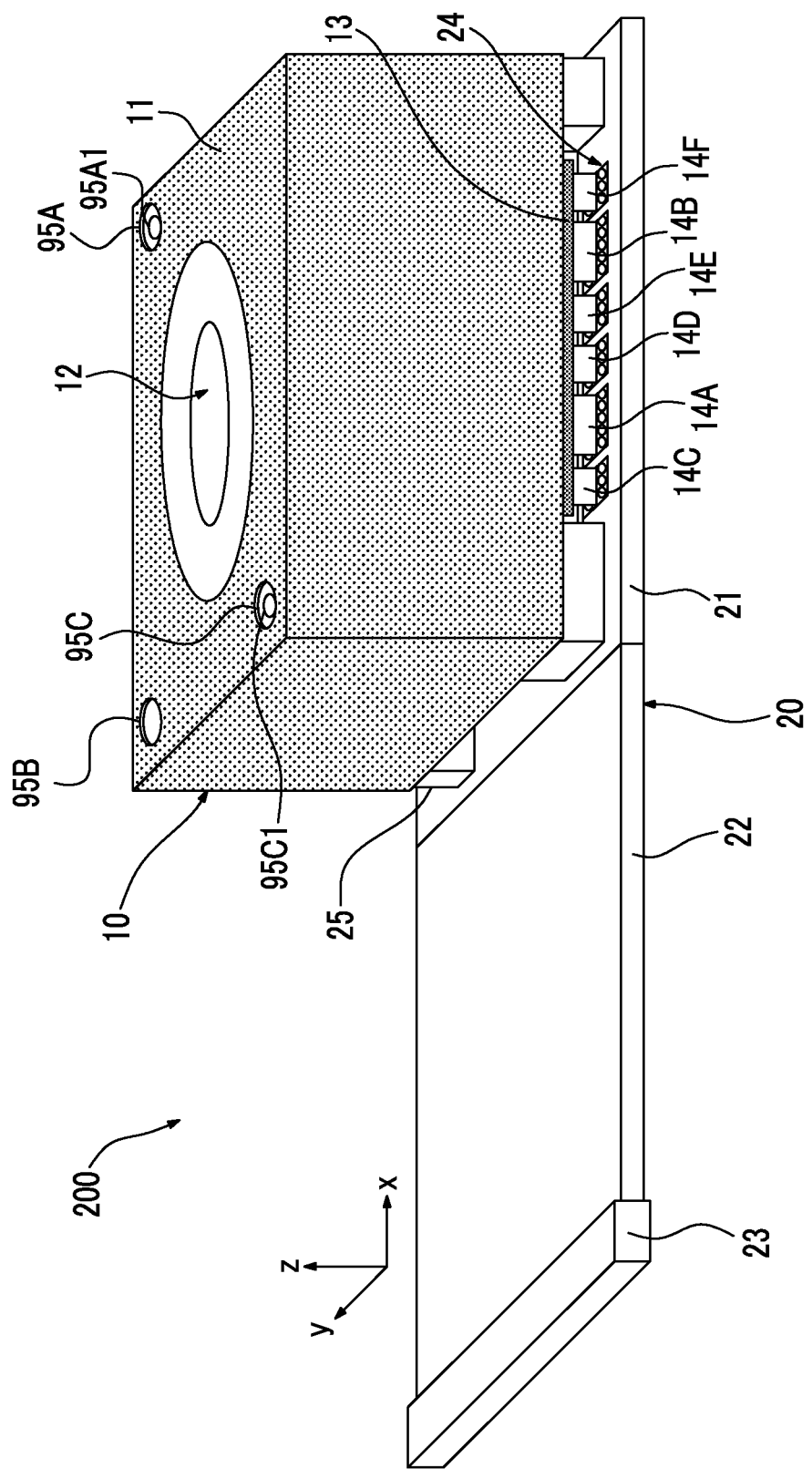
FIG. 7 is an external perspective view of an imaging module 200 which is a modification example of the imaging module 100.

FIG. 7 is an external perspective view of an imaging module 200 which is a modification example of the imaging module 100.

The imaging module 200 has the same configuration as the imaging module 100 except that the positions of the terminals 14A and 14B included in the lens unit terminal portion of the lens unit 10 are changed.

In the imaging module 100, in the arrangement direction (x direction) of the terminals 14A to 14F included in the lens unit terminal portion, other terminals do not exist between the terminal 14A and the terminal 14B having a large exposed area. Meanwhile, in the imaging module 200, other terminals to which electricity does not flow during the adjustment process exist between the terminal 14A and the terminal 14B and are arranged therebetween.

According to this arrangement, it is possible to increase the distance between the terminals which come into contact with the probe pins during the adjustment process. Accordingly, an electrical connection between the probe unit 113 and the terminals 14A and 14B is more easily performed, and it is possible to reduce a cost of the manufacturing apparatus. As a result, it is possible to reduce the manufacturing cost of the imaging module 200.

Second Modification Example

Figure 8:
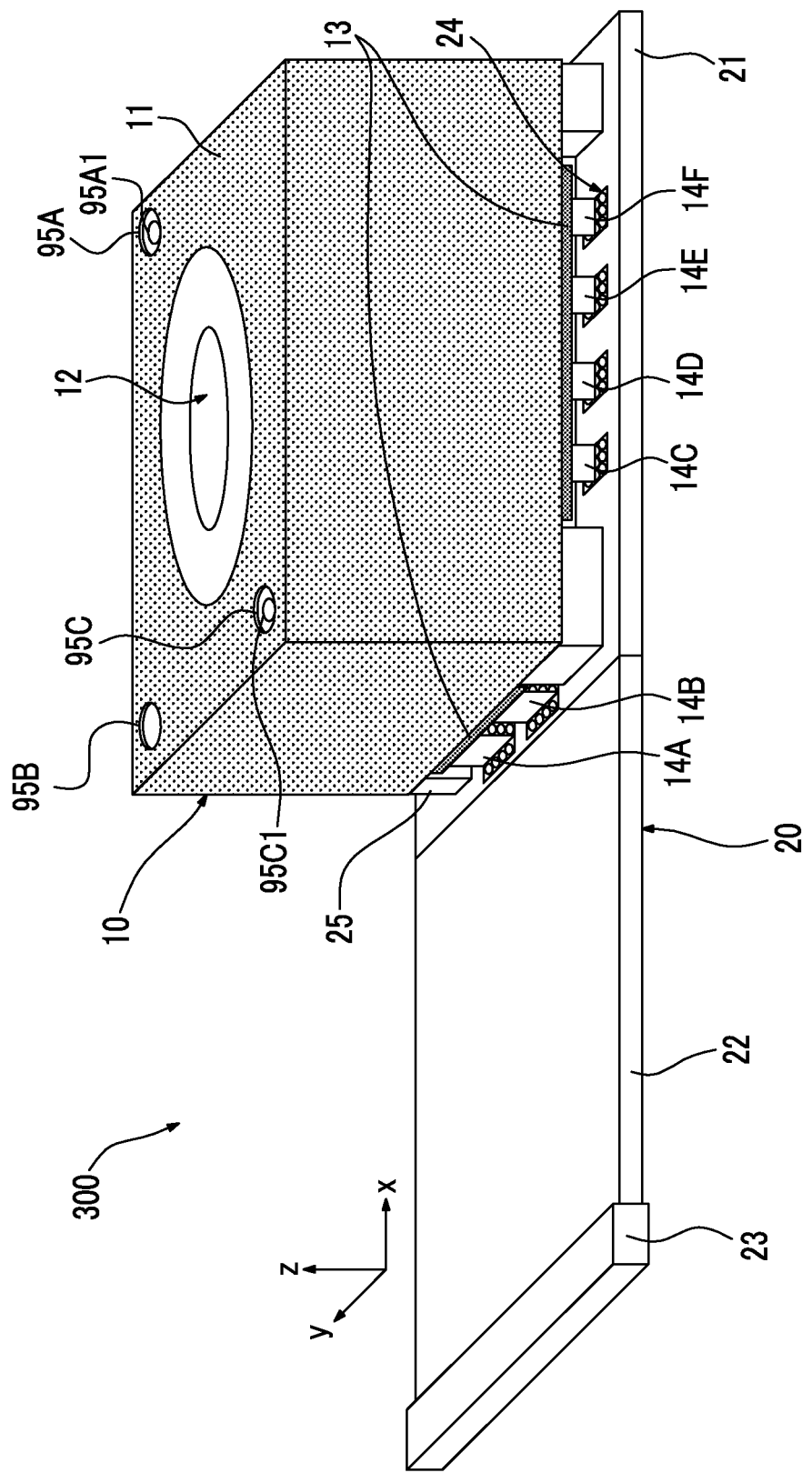
FIG. 8 is an external perspective view of an imaging module 300 which is a modification example of the imaging module 100.

FIG. 8 is an external perspective view of an imaging module 300 which is a modification example of the imaging module 100.

In the imaging module 100, the terminal 14A to the terminal 14F included in the lens unit terminal portion are arranged in the direction along one side of outer edges of the imaging element 27 in a plan view. Meanwhile, the imaging module 300 is different from the imaging module 100 in that the terminal 14A to the terminal 14F are arranged in directions along two sides different from each other (in the example of FIG. 8, the side parallel to the x direction and the side parallel to the y direction in a plan view) of the outer edges of the imaging element 27 in a plan view.

Moreover, in the imaging module 300, the dispositions of the terminals 24A to 24F provided on the substrate 21 are changed according to the changes of the dispositions of the terminal 14A to the terminal 14F.

Among the terminals included in the lens unit terminal portion of the imaging module 300, the terminals 14A and 14B are arranged in the direction along the side parallel to the y direction of the imaging element 27, and the remaining terminals are arranged in the direction along the side parallel to the x direction of the imaging element 27.

Since the length of one side of the imaging element 27 is limited, among the terminals included in the lens unit terminal portion, the terminals 14A and 14B having large exposed areas and the remaining terminals having small exposed areas are arranged in the directions along the sides different from each other of the imaging element 27 in a plan view, and it is possible to increase the exposed areas of the terminals 14A and 14B. Accordingly, probing is easily performed, and it is possible to reduce the manufacturing cost of the imaging module 300.

Third Modification Example

Figure 9:
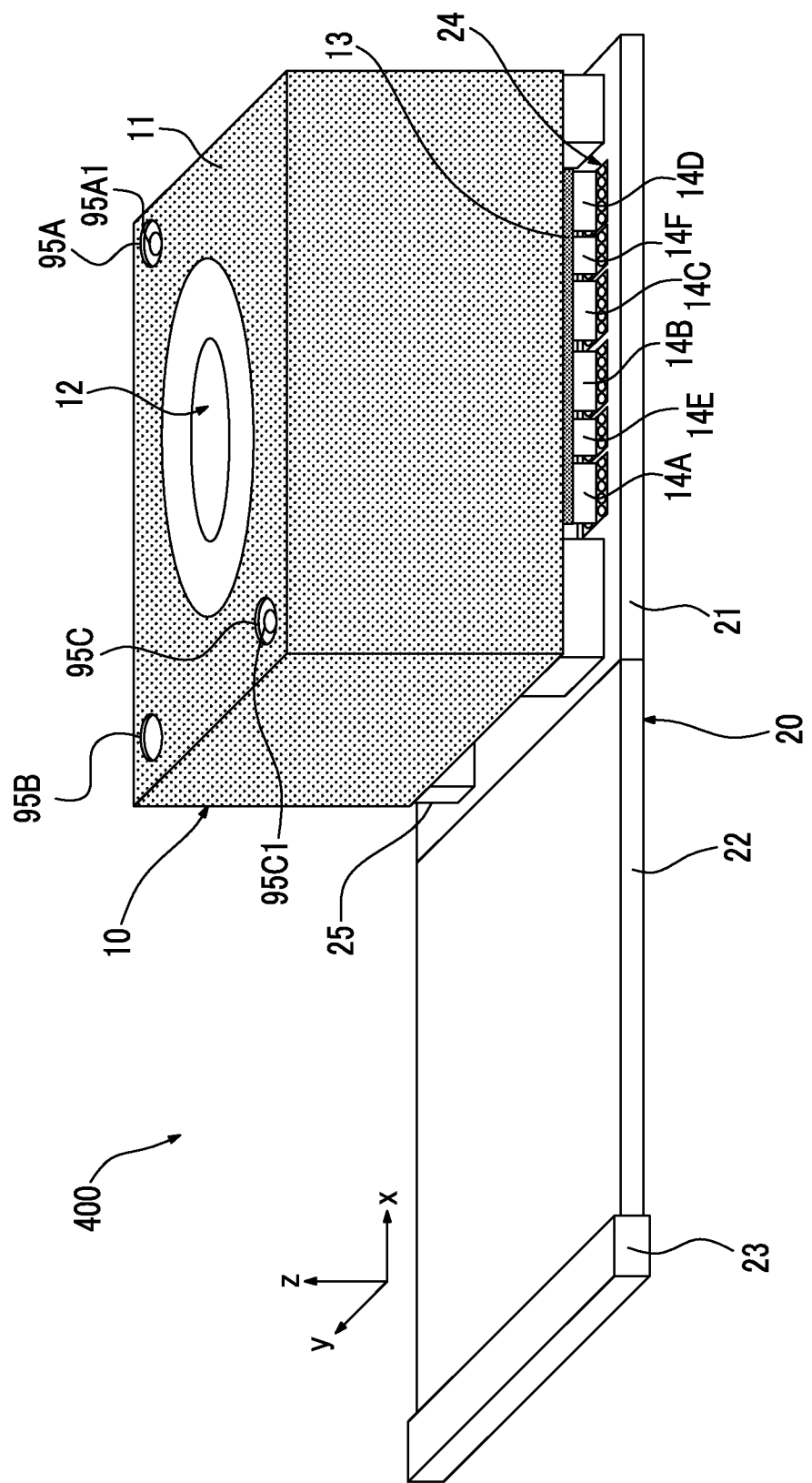
FIG. 9 is an external perspective view of an imaging module 400 which is a modification example of the imaging module 100.

FIG. 9 is an external perspective view of an imaging module 400 which is a modification example of the imaging module 100.

The imaging module 400 has the same configuration as the imaging module 100 except that among the terminals included in the lens unit terminal portion of the lens unit 10, the exposed areas of the terminals 14A to 14D are larger than the exposed areas of the remaining terminals.

In a manufacturing apparatus for manufacturing the imaging module 400, in FIG. 5, the probe unit 113 is configured so as to include the probe pin for coming into contact with each of the terminals 14A to 14D.

Moreover, in this manufacturing apparatus, in a state where the second lens driving unit and the third lens driving unit are driven via the probe unit 113, and the position in the x direction and the position in the y direction of the lens group 12 are controlled so as to reach desired positions, the positioning of the lens unit 10 and the imaging element unit 20 is performed.

If the imaging module 100 is held in the state where the x direction is parallel to the gravity direction, as described above, the lens group 12 moves in the gravity direction. However, the lens group 12 is likely to be slightly displaced in the y direction due to this movement.

In order to correct this displacement, in the manufacturing apparatus of the imaging module 400, electricity also flows to the terminals 14C and 14D during the adjustment process.

Similarly to the terminals 14A and 14B, the terminals 14C and 14D, to which electricity is to be applied, have larger exposed areas than those of other terminals to which electricity does not flow during the adjustment process. Accordingly, probing is easily performed, and it is possible to reduce the manufacturing cost of the imaging module 400.

Moreover, in the imaging module 400 of FIG. 9, by arranging the terminals 14A to 14D having large exposed areas and the terminals having small exposed areas in the directions along the sides different from each other of the imaging element 27 in a plan view, it is possible to further increase the exposed areas of the terminals 14A to 14D.

Fourth Modification Example

Figure 10:
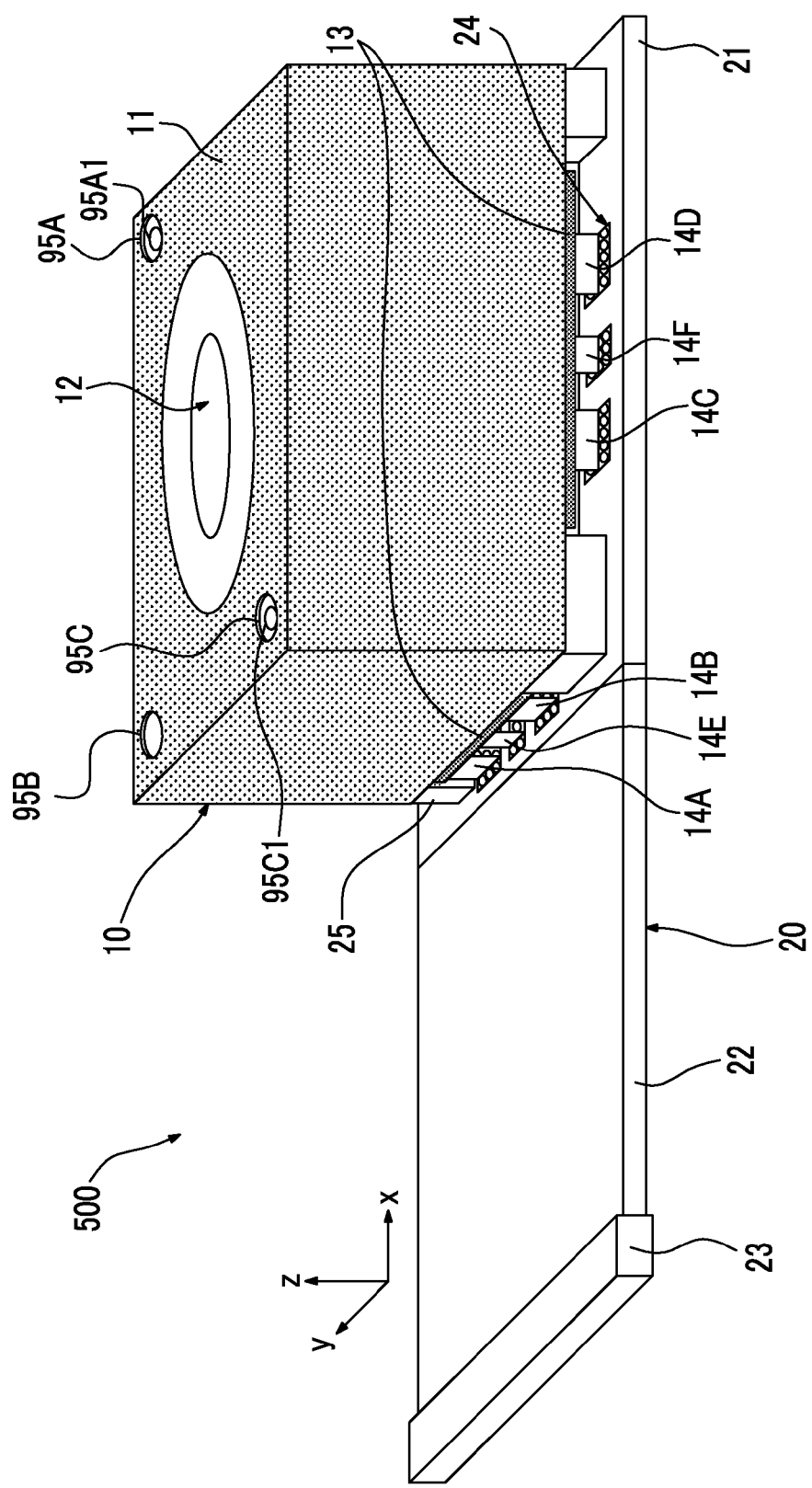
FIG. 10 is an external perspective view of an imaging module 500 which is a modification example of the imaging module 100.

FIG. 10 is an external perspective view of an imaging module 500 which is a modification example of the imaging module 100.

In the imaging module 400 of FIG. 9, the terminal 14A to the terminal 14F included in the lens unit terminal portion are arranged in the direction along one side of the outer edges of the imaging element 27 in a plan view. Meanwhile, the imaging module 500 is different from the imaging module 400 in that the terminals 14A to the terminals 14F among the terminals included in the lens unit terminal portion are arranged in directions along two sides different from each other of the outer edges of the imaging element 27 in a plan view.

In addition, in the imaging module 500, the dispositions of the terminals 24A to 24F provided on the substrate 21 are changed according to the changes of the dispositions of the terminal 14A to the terminal 14F.

The terminals 14A, 14E, and 14B of the imaging module 500 are arranged in the direction along the side of the imaging element 27 parallel to the y direction in a plan view. In addition, the terminals 14C, 14F, and 14D of the imaging module 500 are arranged in the direction along the side of the imaging element 27 parallel to the x direction in a plan view.

In this way, among the terminals included in the lens unit terminal portion, a portion of the four terminals 14A to 14D having large exposed areas and the remaining terminals expect for the portion of the four terminals 14A to 14D are arranged in the directions along the sides different from each other of the imaging element 27 in a plan view. Accordingly, it is possible to increase the exposed area of each of the terminals 14A to 14D. Therefore, probing is easily performed, and it is possible to reduce the manufacturing cost of the imaging module 500.

In the imaging module 400 of FIG. 9, since the terminals, to which electricity does not flow during the adjustment processing, do not exist between the terminal 14B and the terminal 14C, it is difficult to increase the gap between the terminal 14B and 14C.

Meanwhile, according to the imaging module 500, it is possible to largely increase the distance between the terminal 14B and the terminal 14C. Accordingly, probing is easily performed, and it is possible to reduce the manufacturing cost of the imaging module 500.

Fifth Modification Example

In the manufacturing apparatus 30 shown in FIG. 5, it is assumed that the angle between the gravity direction and the Z axis direction is 90°. However, the angle between the gravity direction and the Z axis direction may be less than 90°. For example, a configuration in which the surface of the workbench 87 is inclined right and left on the paper surface corresponds to this case.

In this case, gravity applied to the lens group 12 is divided into an x direction component and a z direction component. That is, in the state where the lens unit 10 is held by the manufacturing apparatus 30, the lens group 12 moves in the z direction and the x direction.

In this case, in the imaging modules 400 and 500, the terminals to which electricity flows during the adjustment process may be set to the terminals 14A, 14B, 14E, and 14F among the terminals included in the lens unit terminal portion, and the exposed areas of the terminals 14A, 14B, 14E, and 14F may be larger than the exposed areas of the terminals except for the terminals 14A, 14B, 14E, and 14F.

In addition, the probe unit 113 of the manufacturing apparatus 30 is configured so as to include a probe pin for coming into contact with each of the terminals 14A, 14B, 14E, and 14F.

In addition, in this manufacturing apparatus, in a state where the second lens driving unit and the first lens driving unit are driven via the probe unit 113, and the position in the x direction and the position in the z direction of the lens group 12 are controlled so as to reach desired positions, the positioning of the lens unit 10 and the imaging element unit 20 is performed.

In this way, during the adjustment process, even in the case where the x direction and the z direction of the lens unit 10 are not perpendicular to the gravity direction, only the y direction is perpendicular to the gravity direction, and the lens group 12 is affected by gravity and moves in the x direction and the z direction, according to the configuration, the positioning of the lens group 12 can be performed in a state where the lens group 12 is controlled so as to be a desired position.

In addition, in the manufacturing apparatus in which the surface of the workbench 87 is inclined from the front side of the paper surface to the rear side, during the adjustment process, the x direction and the y direction of the lens unit 10 are not perpendicular to the gravity direction, and only the z direction is perpendicular to the gravity direction.

Accordingly, when the manufacturing apparatus is used, it is possible to perform the positioning of the lens unit 10 and the imaging element unit 20 with high accuracy by adopting the configuration of the imaging module shown in FIGS. 9 and 10.

Sixth Modification Example

In the manufacturing processes of the imaging module 100 and the imaging modules described in the first to fourth modification examples, during the adjustment process, the lens unit 10 is held in the state where the x direction is parallel to the gravity direction, and the positioning is performed. As this modification example, during the adjustment process, the lens unit 10 is held in a state where the y direction is parallel to the gravity direction, and the positioning may be performed.

In this case, in FIGS. 1, 7, and 8, the reference numeral 14A is replaced by the reference numeral 14C, the reference numeral 14B is replaced by the reference numeral 14D, the reference numeral 14C is replaced by the reference numeral 14A, and the reference numeral 14D is replaced by the reference numeral 14B. According to this configuration, the positioning can be performed in a state where the position in the y direction of the lens group 12, in which the position is moved due to the influences of gravity, is controlled so as to be a desired position.

Seventh Modification Example

During the adjustment process, the lens unit 10 is held in a state where each of the x direction, the y direction, and the z direction intersects the gravity direction, and the positioning may be performed. For example, a manufacturing apparatus, in which the surface of the workbench 87 is inclined from the front side of the paper surface to the rear side and is inclined right and left on the paper surface, corresponding to this.

In this case, in the imaging module 100, the terminals to which electricity flows during the adjustment process may be set to the terminals 14A, 14B, 14C, 14D, 14E, and 14F among the terminals included in the lens unit terminal portion, and the exposed areas of the terminals 14A, 14B, 14C, 14D, 14E, and 14F may be larger than the exposed areas of the terminals except for the terminals 14A, 14B, 14C, 14D, 14E, and 14F.

In addition, the probe unit 113 of the manufacturing apparatus 30 is configured so as to include a probe pin for coming into contact with each of the terminals 14A, 14B, 14C, 14D, 14E, and 14F.

Moreover, in this manufacturing apparatus, in a state where the first lens driving unit, the second lens driving unit, and the third lens driving unit are driven via the probe unit 113, and the position in the x direction, the position in the y direction, and the position in the z direction of the lens group 12 are controlled so as to reach desired positions, the positioning of the lens unit 10 and the imaging element unit 20 is performed.

In this way, during the adjustment process, even in the case where the x direction, the y direction, and the z direction of the lens unit 10 are not perpendicular to the gravity direction, and the lens group 12 is affected by gravity and moves in the x direction, the y direction, and the z direction, according to the configuration, the positioning of the lens group 12 can be performed in a state where the lens group 12 is controlled so as to be a desired position.

Eighth Modification Example

Hereinbefore, the configurations in which electricity flows to only the lens driving unit during the adjustment process are described. However, in order to enhance accuracy, the positioning may be performed in a state where electricity also flows to the hall element included in the lens drive unit 16.

For example, when the second lens driving unit is driven and the position in the x direction of the lens group 12 is controlled during the adjustment process, electricity also flows to the four terminals 14a to 14d connected to the x-direction hall element 16B during the adjustment process, information from the x-direction hall element 16B is used, and it is possible to control the position in the x direction of the lens group 12 with high accuracy. Accordingly, the exposed areas of the terminals 14a to 14d are larger than the exposed areas of the terminals to which electricity does not flow during the adjustment process, and it is possible to reduce the manufacturing cost.

In addition, when the third lens driving unit is driven and the position in the y direction of the lens group 12 is controlled during the adjustment process, electricity also flows to the four terminals 14e to 14h connected to the y-direction hall element 16D during the adjustment process, information from the y-direction hall element 16D is used, and it is possible to control the position in the y direction of the lens group 12 with high accuracy. Accordingly, the exposed areas of the terminals 14e to 14h are larger than the exposed areas of the terminals to which electricity does not flow during the adjustment process, and it is possible to reduce the manufacturing cost.

In addition, when the first lens driving unit is driven and the position in the z direction of the lens group 12 is controlled during the adjustment process, electricity also flows to the four terminals 14i to 14l connected to the z-direction hall element 16F of the lens group 12 during the adjustment process, information from the z-direction hall element 16F is used, and it is possible to control the position in the z direction of the lens group 12 with high accuracy. Accordingly, the exposed areas of the terminals 14i to 14l are larger than the exposed areas of the terminals to which electricity does not flow during the adjustment process, and it is possible to reduce the manufacturing cost.

Hereinbefore, the configurations are described in which the exposed areas of all terminals to which electricity flows during the adjustment process are larger than the exposed areas of the terminals to which electricity does not flow during the adjustment process. However, when the exposed area of at least one of all terminals to which electricity flows during the adjustment process is larger than the exposed area to which electricity does not flow during the adjustment process, since probing is easily performed, it is possible to obtain a reduction effect of the manufacturing cost.

For example, in the imaging modules 100, 200 and 300, the exposed area of at least one of the terminals 14A and 14B may increase.

Moreover, in the imaging modules 400 and 500, the exposed area of at least one of the terminals 14A to 14D may increase.

Ninth Modification Example

Hereinbefore, configurations are described, in which differences of the exposed areas of the plurality of terminals configuring the lens unit terminal portion connected to the flexible substrate 13 of the lens unit 10 are obtained by changing the lengths in the arrangement direction of the plurality of terminals on the exposed surfaces of the plurality of terminals. However, the differences of the exposed areas of the plurality of terminals may be obtained by changing the lengths in the direction orthogonal to the arrangement direction of the plurality of terminals on the exposed surfaces of the plurality of terminals.

Figure 11:
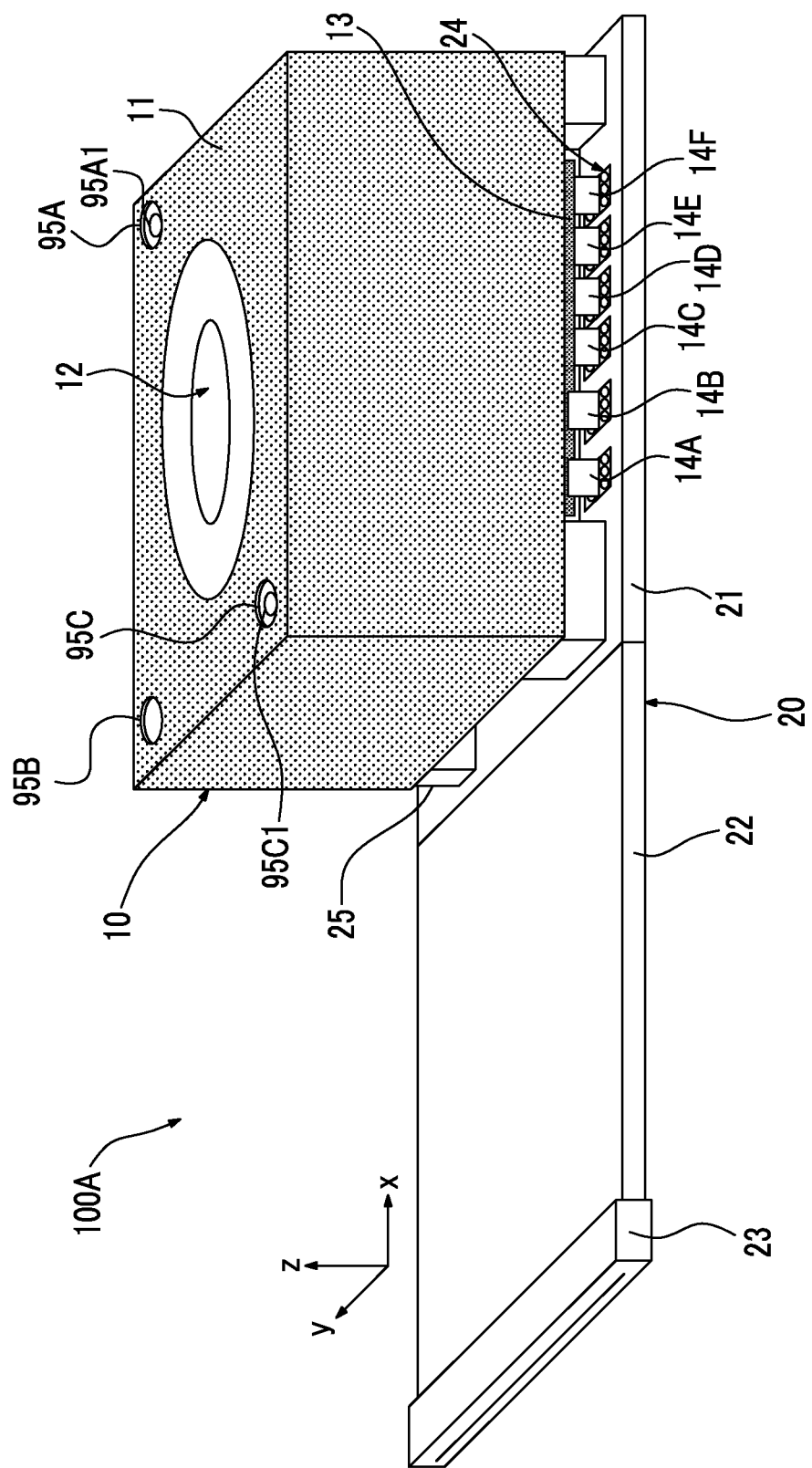
FIG. 11 is an external perspective view of an imaging module 100A which is a modification example of the imaging module 100 shown in FIG. 1.

FIG. 11 is an external perspective view of an imaging module 100A which is a modification example of the imaging module 100 shown in FIG. 1.

In the imaging module 100A, the lengths in the x direction on the exposed surfaces of the terminals 14A to 14F are the same as each other, and the lengths in the z direction on the exposed surfaces of the terminals 14A and 14B are longer than the lengths in the z direction on the exposed surfaces of the terminals 14C to 14F.

In this way, according to the configuration in which the exposed areas of the terminals on the exposed surfaces of the terminals are increased by changing the lengths in the direction orthogonal to the arrangement direction of the terminals 14A to 14F, even when the number of the terminals provided in the lens unit 10 is large, it is possible to sufficiently secure the exposed areas.

In addition, the exposed areas of the terminals may be increased by increasing both the lengths in the x direction and the lengths in the z direction on the exposed surfaces of the terminals.

As described above, the following matters are disclosed in the present specification.

The disclosed imaging module includes a lens unit which includes a lens group, and an imaging element unit which is fixed to the lens unit and includes an imaging element which captures a subject through the lens group. The lens unit includes a first lens driving unit which moves at least a portion of lenses of the lens group in a first direction along an optical axis of the lens group, and a second lens driving unit and a third lens driving unit which moves at least a portion of the lenses of the lens group in a second direction and a third direction orthogonal to the optical axis of the lens group, respectively. In addition, the lens unit includes a connection portion group which includes a plurality of first connection portions electrically connected to the first lens driving unit, a plurality of second connection portions electrically connected to the second lens driving unit, and a plurality of third connection portions electrically connected to the third lens driving unit. Moreover, the lens unit includes a housing in which at least the first lens driving unit, the second lens driving unit, and the third lens driving unit are accommodated. The imaging element unit includes a fourth connection portion which is electrically connected to each connection portion included in the connection portion group. Each connection portion included in the connection portion group includes an exposed surface, which is exposed outside the housing, in a portion of the connection portion. The connection portion group includes a connection portion in which the exposed surface has a first area, and a connection portion in which the exposed surface has a second area which is larger than the first area. Among the plurality of first connection portions, the plurality of second connection portions, and the plurality of third connection portions, any one of the exposed surfaces of at least the plurality of second connection portions and the plurality of third connection portions has the second area.

In the disclosed imaging module, the exposed surface of each connection portion of the plurality of first connection portions may have the first area, and at least one exposed surface of the plurality of second connection portions and the plurality of third connection portions may have the second area.

In the disclosed imaging module, the second direction and the third direction may be orthogonal to each other, and the exposed surface of at least one connection portion of the plurality of second connection portions may have the second area, and the exposed surface of each connection portion of the plurality of third connection portions may have the first area.

In the disclosed imaging module, each of the exposed surface of each connection portion of the plurality of first connection portions, the exposed surface of each connection portion of the plurality of second connection portions, and the exposed surface of each connection portion of the plurality of third connection portions may have the second area.

In the disclosed imaging module, the connection portions included in the connection portion group may be arranged in a direction along a side of the imaging element in a plan view when viewed from the subject side, a length of the connection portion in an arrangement direction of the connection portions included in the connection portion group on the exposed surface of the connection portion in which the exposed surface has the second area may be longer than a length of the connection portion in the arrangement direction on the exposed surface of the connection portion in which the exposed surface has the first area, and the connection portion in which the exposed surface has the second area and the connection portion in which the exposed surface has the first area may be arranged in directions along sides different from each other of the imaging element in the plan view.

In the disclosed imaging module, the connection portions included in the connection portion group may be arranged in a direction along a side of the imaging element in a plan view when viewed from the subject side, a length of the connection portion in an arrangement direction of the connection portions included in the connection portion group on the exposed surface of the connection portion in which the exposed surface has the second area may be longer than a length in the arrangement direction on the exposed surface of the connection portion in which the exposed surface has the first area, the connection portion group may include a plurality of connection portions in which the exposed surfaces have the second areas, and a portion of the connection portions in which the exposed surfaces have the second areas, and remaining connection portions except for the portion of the plurality of connection portions may be arranged in directions along sides different from each other of the imaging element in the plan view.

In the disclosed imaging module, a connection portion having the first area may be disposed in at least one location between the plurality of connection portions which are arranged in the arrangement direction and in which the exposed surfaces have the second areas.

In the disclosed imaging module, the connection portion group may include a plurality of connection portions in which the exposed surfaces have the second areas, and a connection portion, in which the exposed surface has the first area, and may be disposed in at least one location between the plurality of connection portions in which the exposed surfaces have the second areas.

In the disclosed imaging module, the connection portions included in the connection portion group may be arranged in a direction along the side of the imaging element in a plan view when viewed from the subject side, and a length of the connection portion in a direction orthogonal to the arrangement direction of the connection portions included in the connection portion group on the exposed surface of the connection portion in which the exposed surface has the second area may be longer than a length in the orthogonal direction on the exposed surface of the connection portion in which the exposed surface has the first area.

In the disclosed imaging module, a pixel pitch of the imaging element may be 1.0 μm or less.

The disclosed electronic device includes the imaging module.

Particularly, the imaging module of the present invention is applied to an electronic device such as a portable phone, a wristwatch type electronic device, a spectacle type electronic device, or the like, and convenience and effectiveness increase.

EXPLANATION OF REFERENCES

100: imaging module
10: lens unit
11: housing
12: lens group
13: flexible substrate
14A, 14B: x-direction VCM drive terminal
14C, 14D: y-direction VCM drive terminal
14E, 14F: z-direction VCM drive terminal
16: lens drive unit
16A: x-direction VCM
16B: x-direction hall element
16C: y-direction VCM
16D: y-direction hall element
16E: z-direction VCM
16F: z-direction hall element
20: imaging element unit
21: substrate
22: flexible substrate
23: external connection terminal
24A to 24F: imaging element unit side terminal
27: imaging element
30: imaging module manufacturing apparatus
Ax: optical axis
z: direction along optical axis
x: direction orthogonal to z direction
y: direction orthogonal to z direction

What is claimed is:

1. A manufacturing method of an imaging module including
a lens unit which includes a lens group, and
an imaging element unit which is fixed to the lens unit and includes an imaging element which captures a subject through the lens group,
wherein the lens unit includes
a first lens driving unit which moves at least a portion of lenses of the lens group in a first direction along an optical axis of the lens group,
a second lens driving unit and a third lens driving unit which move at least a portion of the lenses of the lens group in a second direction and a third direction orthogonal to the optical axis of the lens group, respectively,
a connection portion group which includes a plurality of first connection portions which electrically connect the first lens driving unit and the imaging element unit, a plurality of second connection portions which electrically connect the second lens driving unit and the imaging element unit, and a plurality of third connection portions which electrically connect the third lens driving unit and the imaging element unit, and
a housing in which at least the first lens driving unit, the second lens driving unit, the third lens driving unit, and a portion of the connection portion group is accommodated,
wherein the imaging element unit includes a fourth connection portion which electrically connects the imaging element unit and each connection portion included in the connection portion group of the lens unit,
wherein each connection portion included in the connection portion group includes an exposed surface, which is exposed outside the housing, in a portion of the connection portion,
wherein the connection portion group includes a connection portion in which the exposed surface has a first area, and a connection portion in which the exposed surface has a second area which is larger than the first area, and
wherein among the plurality of first connection portions, the plurality of second connection portions, and the plurality of third connection portions, any one of the exposed surfaces of at least the plurality of second connection portions and the plurality of third connection portions has the second area,
the manufacturing method comprising:
an adjustment process of allowing electricity to flow to the connection portion having the second area in a probing manner so as to drive the lens driving unit, and adjusting positions of the lens unit and the imaging element unit; and
a process of fixing the lens unit and the imaging element unit after the adjustment process.

2. The manufacturing method of the imaging module according to claim 1,
wherein the exposed surface of each connection portion of the plurality of first connection portions has the first area, and
wherein at least one exposed surface of the plurality of second connection portions and the plurality of third connection portions has the second area.

3. The manufacturing method of the imaging module according to claim 2,
wherein the second direction and the third direction are orthogonal to each other, and
wherein the exposed surface of at least one connection portion of the plurality of second connection portions has the second area, and the exposed surface of each connection portion of the plurality of third connection portions has the first area.

4. The manufacturing method of the imaging module according to claim 1,
wherein each of the exposed surface of each connection portion of the plurality of first connection portions, the exposed surface of each connection portion of the plurality of second connection portions, and the exposed surface of each connection portion of the plurality of third connection portions has the second area.

5. The manufacturing method of the imaging module according to claim 1,
wherein the connection portions included in the connection portion group are arranged in a direction along a side of the imaging element in a plan view when viewed from the subject side,
wherein a length of the connection portion in an arrangement direction of the connection portions included in the connection portion group on the exposed surface of the connection portion in which the exposed surface has the second area is longer than a length of the connection portion in the arrangement direction on the exposed surface of the connection portion in which the exposed surface has the first area, and wherein the connection portion in which the exposed surface has the second area and the connection portion in which the exposed surface has the first area are arranged in directions along sides different from each other of the imaging element in the plan view.

6. The manufacturing method of the imaging module according to claim 2, wherein the connection portions included in the connection portion group are arranged in a direction along a side of the imaging element in a plan view when viewed from the subject side, wherein a length of the connection portion in an arrangement direction of the connection portions included in the connection portion group on the exposed surface of the connection portion in which the exposed surface has the second area is longer than a length of the connection portion in the arrangement direction on the exposed surface of the connection portion in which the exposed surface has the first area, and wherein the connection portion in which the exposed surface has the second area and the connection portion in which the exposed surface has the first area are arranged in directions along sides different from each other of the imaging element in the plan view.

7. The manufacturing method of the imaging module according to claim 3, wherein the connection portions included in the connection portion group are arranged in a direction along a side of the imaging element in a plan view when viewed from the subject side, wherein a length of the connection portion in an arrangement direction of the connection portions included in the connection portion group on the exposed surface of the connection portion in which the exposed surface has the second area is longer than a length of the connection portion in the arrangement direction on the exposed surface of the connection portion in which the exposed surface has the first area, and wherein the connection portion in which the exposed surface has the second area and the connection portion in which the exposed surface has the first area are arranged in directions along sides different from each other of the imaging element in the plan view.

8. The manufacturing method of the imaging module according to claim 4, wherein the connection portions included in the connection portion group are arranged in a direction along a side of the imaging element in a plan view when viewed from the subject side, wherein a length of the connection portion in an arrangement direction of the connection portions included in the connection portion group on the exposed surface of the connection portion in which the exposed surface has the second area is longer than a length of the connection portion in the arrangement direction on the exposed surface of the connection portion in which the exposed surface has the first area, and wherein the connection portion in which the exposed surface has the second area and the connection portion in which the exposed surface has the first area are arranged in directions along sides different from each other of the imaging element in the plan view.

9. The manufacturing method of the imaging module according to claim 1, wherein the connection portions included in the connection portion group are arranged in a direction along a side of the imaging element in a plan view when viewed from the subject side, wherein a length of the connection portion in an arrangement direction of the connection portions included in the connection portion group on the exposed surface of the connection portion in which the exposed surface has the second area is longer than a length in the arrangement direction on the exposed surface of the connection portion in which the exposed surface has the first area, wherein the connection portion group includes a plurality of connection portions in which the exposed surfaces have the second areas, and wherein a portion of the plurality of connection portions in which the exposed surfaces have the second areas, and remaining connection portions except for the portion of the plurality of connection portions are arranged in directions along sides different from each other of the imaging element in the plan view.

10. The manufacturing method of the imaging module according to claim 2, wherein the connection portions included in the connection portion group are arranged in a direction along a side of the imaging element in a plan view when viewed from the subject side, wherein a length of the connection portion in an arrangement direction of the connection portions included in the connection portion group on the exposed surface of the connection portion in which the exposed surface has the second area is longer than a length in the arrangement direction on the exposed surface of the connection portion in which the exposed surface has the first area, wherein the connection portion group includes a plurality of connection portions in which the exposed surfaces have the second areas, and wherein a portion of the plurality of connection portions in which the exposed surfaces have the second areas, and remaining connection portions except for the portion of the plurality of connection portions are arranged in directions along sides different from each other of the imaging element in the plan view.

11. The manufacturing method of the imaging module according to claim 3, wherein the connection portions included in the connection portion group are arranged in a direction along a side of the imaging element in a plan view when viewed from the subject side, wherein a length of the connection portion in an arrangement direction of the connection portions included in the connection portion group on the exposed surface of the connection portion in which the exposed surface has the second area is longer than a length in the arrangement direction on the exposed surface of the connection portion in which the exposed surface has the first area, wherein the connection portion group includes a plurality of connection portions in which the exposed surfaces have the second areas, and wherein a portion of the plurality of connection portions in which the exposed surfaces have the second areas, and remaining connection portions except for the portion of the plurality of connection portions are arranged in directions along sides different from each other of the imaging element in the plan view.

12. The manufacturing method of the imaging module according to claim 4,
wherein the connection portions included in the connection portion group are arranged in a direction along a side of the imaging element in a plan view when viewed from the subject side,
wherein a length of the connection portion in an arrangement direction of the connection portions included in the connection portion group on the exposed surface of the connection portion in which the exposed surface has the second area is longer than a length in the arrangement direction on the exposed surface of the connection portion in which the exposed surface has the first area,
wherein the connection portion group includes a plurality of connection portions in which the exposed surfaces have the second areas, and
wherein a portion of the plurality of connection portions in which the exposed surfaces have the second areas, and remaining connection portions except for the portion of the plurality of connection portions are arranged in directions along sides different from each other of the imaging element in the plan view.

13. The manufacturing method of the imaging module according to claim 9,
wherein a connection portion, in which the exposed surface has the first area, is disposed in at least one location between the plurality of connection portions which are arranged in the arrangement direction and in which the exposed surfaces have the second areas.

14. The manufacturing method of the imaging module according to claim 1,
wherein the connection portion group includes a plurality of connection portions in which the exposed surfaces have the second areas, and
wherein a connection portion, in which the exposed surface has the first area, is disposed in at least one location between the plurality of connection portions in which the exposed surfaces have the second areas.

15. The manufacturing method of the imaging module according to claim 2,
wherein the connection portion group includes a plurality of connection portions in which the exposed surfaces have the second areas, and
wherein a connection portion, in which the exposed surface has the first area, is disposed in at least one location between the plurality of connection portions in which the exposed surfaces have the second areas.

16. The manufacturing method of the imaging module according to claim 1,
wherein the connection portions included in the connection portion group are arranged in a direction along the side of the imaging element in a plan view when viewed from the subject side, and
wherein a length of the connection portion in a direction orthogonal to the arrangement direction of the connection portions included in the connection portion group on the exposed surface of the connection portion in which the exposed surface has the second area is longer than a length of the connection portion in the orthogonal direction on the exposed surface of the connection portion in which the exposed surface has the first area.

17. The manufacturing method of the imaging module according to claim 1,
wherein a pixel pitch of the imaging element is 1.0 µm or less.

18. The manufacturing method of an image module according to claim 1,
wherein in the adjustment process, the positions of the lens unit and the imaging element unit are adjusted in a state where the second direction and the third direction are set to the gravity direction.

19. An imaging module comprising:
a lens unit which includes a lens group; and
an imaging element unit which is fixed to the lens unit and includes an imaging element which captures a subject through the lens group,
wherein the lens unit includes
a first lens driving unit which moves at least a portion of lenses of the lens group in a first direction along an optical axis of the lens group,
a second lens driving unit and a third lens driving unit which move at least a portion of the lenses of the lens group in a second direction and a third direction orthogonal to the optical axis of the lens group, respectively,
a connection portion group which includes a plurality of first connection portions which electrically connect the first lens driving unit and the imaging element unit, a plurality of second connection portions which electrically connect the second lens driving unit and the imaging element unit, and a plurality of third connection portions which electrically connect the third lens driving unit and the imaging element unit, and
a housing in which at least a portion of the first lens driving unit, the second lens driving unit, the third lens driving unit, and the connection portion group is accommodated,
wherein the imaging element unit includes a fourth connection portion which electrically connects the imaging element unit and each connection portion included in the connection portion group of the lens unit,
wherein each connection portion included in the connection portion group includes an exposed surface, which is exposed outside the housing, in a portion of the connection portion,
wherein the connection portion group includes a connection portion in which the exposed surface has a first area, and a connection portion in which the exposed surface has a second area which is larger than the first area and which is an area to allow electricity to flow in a probing manner when the imaging module is manufactured, and
wherein among the plurality of first connection portions, the plurality of second connection portions, and the plurality of third connection portions, any one of the exposed surfaces of at least the plurality of second connection portions and the plurality of third connection portions has the second area.

20. An electronic device, comprising the imaging module according to claim 19.

* * * * *